(12) United States Patent
Chang et al.

(10) Patent No.: US 11,830,827 B2
(45) Date of Patent: Nov. 28, 2023

(54) SEMICONDUCTOR MEMORY DEVICES WITH DIELECTRIC FIN STRUCTURES

(71) Applicant: Taiwan Semiconductor Manufacturing Company, Ltd., Hsinchu (TW)

(72) Inventors: Meng-Sheng Chang, Chubei (TW); Chia-En Huang, Xinfeng Township (TW)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 189 days.

(21) Appl. No.: 17/460,652

(22) Filed: Aug. 30, 2021

(65) Prior Publication Data
US 2023/0064751 A1 Mar. 2, 2023

(51) Int. Cl.
*G11C 7/24* (2006.01)
*H01L 23/00* (2006.01)
(Continued)

(52) U.S. Cl.
CPC .............. *H01L 23/576* (2013.01); *G11C 7/24* (2013.01); *G11C 17/16* (2013.01); *G11C 17/18* (2013.01);
(Continued)

(58) Field of Classification Search
CPC ............... H01L 23/576; H01L 21/0259; H01L 29/0665; H01L 29/42392; H01L 29/66742;
(Continued)

(56) References Cited

U.S. PATENT DOCUMENTS

| | | | |
|---|---|---|---|
| 2005/0067651 A1* | 3/2005 | Kim | H01L 29/40114 |
| | | | 257/314 |
| 2014/0239365 A1* | 8/2014 | Lee | H01L 29/66825 |
| | | | 257/316 |

(Continued)

FOREIGN PATENT DOCUMENTS

WO WO-2019125424 A1 * 6/2019 ............. B82Y 10/00

OTHER PUBLICATIONS

Zhang, Xu, A Novel SRAM PUF Stability Improvement Method Using Ionization Irradiation, 2020, Electronics, All pages. (Year: 2020).*

*Primary Examiner* — Michael T Tran
(74) *Attorney, Agent, or Firm* — FOLEY & LARDNER LLP

(57) ABSTRACT

A device includes a memory cell that randomly presents either a first logic state or a second logic state. The memory cell includes: a plurality of first nanostructures extending along a first lateral direction; a plurality of second nanostructures extending along the first lateral direction and disposed at a first side of the plurality of first nanostructures; a plurality of third nanostructures extending along the first lateral direction and disposed at a second side of the plurality of first nanostructures; a dielectric fin structure disposed immediately next to the plurality of first nanostructures along a second lateral direction, wherein a first sidewall of each of the plurality of first nanostructures facing toward or away from the second lateral direction is in contact with the dielectric fin structure; and a first gate structure wrapping around each of the plurality of first nanostructures except for the first sidewall.

20 Claims, 12 Drawing Sheets

(51) Int. Cl.
*G11C 17/16* (2006.01)
*G11C 17/18* (2006.01)
*H04L 9/08* (2006.01)
*H01L 29/423* (2006.01)
*H01L 29/786* (2006.01)
*H01L 21/02* (2006.01)
*H01L 29/66* (2006.01)
*H01L 29/06* (2006.01)
*H10B 20/20* (2023.01)

(52) U.S. Cl.
CPC ...... *H01L 21/0259* (2013.01); *H01L 29/0665* (2013.01); *H01L 29/42392* (2013.01); *H01L 29/66742* (2013.01); *H01L 29/78696* (2013.01); *H04L 9/0866* (2013.01); *H10B 20/20* (2023.02)

(58) Field of Classification Search
CPC . H01L 29/78696; H01L 23/5252; G11C 7/24; G11C 17/16; G11C 17/18; H04L 9/0866; H04L 9/3278; H10B 20/20; H10B 20/25

USPC .............................................. 365/96, 230.06
See application file for complete search history.

(56) References Cited

U.S. PATENT DOCUMENTS

| | | | |
|---|---|---|---|
| 2014/0376309 A1* | 12/2014 | Cheng | H10N 70/231 438/106 |
| 2017/0278927 A1* | 9/2017 | Li | H01L 29/66439 |
| 2018/0047743 A1* | 2/2018 | Kwon | H01L 29/40117 |
| 2021/0249424 A1* | 8/2021 | Chang | G11C 17/18 |
| 2021/0305420 A1* | 9/2021 | Frougier | H01L 29/66795 |
| 2021/0358528 A1* | 11/2021 | Chern | G11C 11/4078 |
| 2021/0391331 A1* | 12/2021 | Lin | H01L 29/42392 |
| 2021/0408014 A1* | 12/2021 | Liaw | H01L 29/78696 |

\* cited by examiner

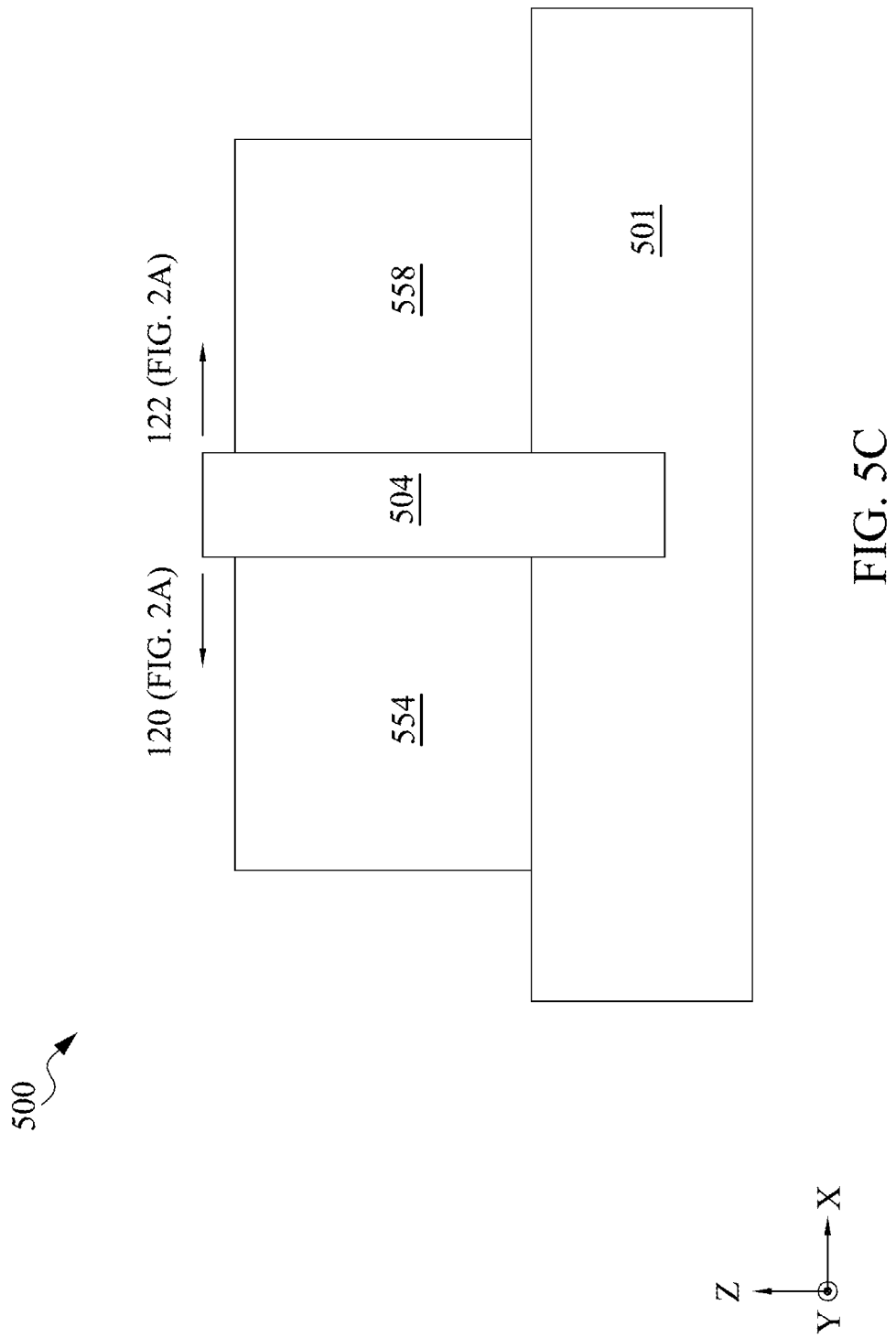

SEMICONDUCTOR MEMORY DEVICES WITH DIELECTRIC FIN STRUCTURES

BACKGROUND

Integrated circuits (ICs) sometimes include one-time-programmable (OTP) memories to provide non-volatile memory (NVM) in which data are not lost when the IC is powered off. One type of the OTP devices includes anti-fuse memories. The anti-fuse memories include a number of anti-fuse memory cells (or bit cells), whose terminals are disconnected before programming, and are shorted (e.g., connected) after the programming. The anti-fuse memories may be based on metal-oxide-semiconductor (MOS) technology. For example, an anti-fuse memory cell may include a programming MOS transistor (or MOS capacitor) and at least one reading MOS transistor coupled in series. A gate dielectric of the programming MOS transistor may be broken down to cause the gate and the source or drain of the programming MOS transistor to be interconnected. Depending on whether the gate dielectric of the programming MOS transistor is broken down, different data bits can be presented by the anti-fuse memory cell through reading a resultant current flowing through the programming MOS transistor and reading MOS transistor. The anti-fuse memories have the advantageous features of reverse-engineering proofing since the programming states of the anti-fuse cells cannot be determined through reverse engineering.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIGS. 5A, 5B, and 5C illustrates various cross-sectional views of a memory device formed based on the layout of FIG. 4A, in accordance with some embodiments.

DETAILED DESCRIPTION

Figure 1A:
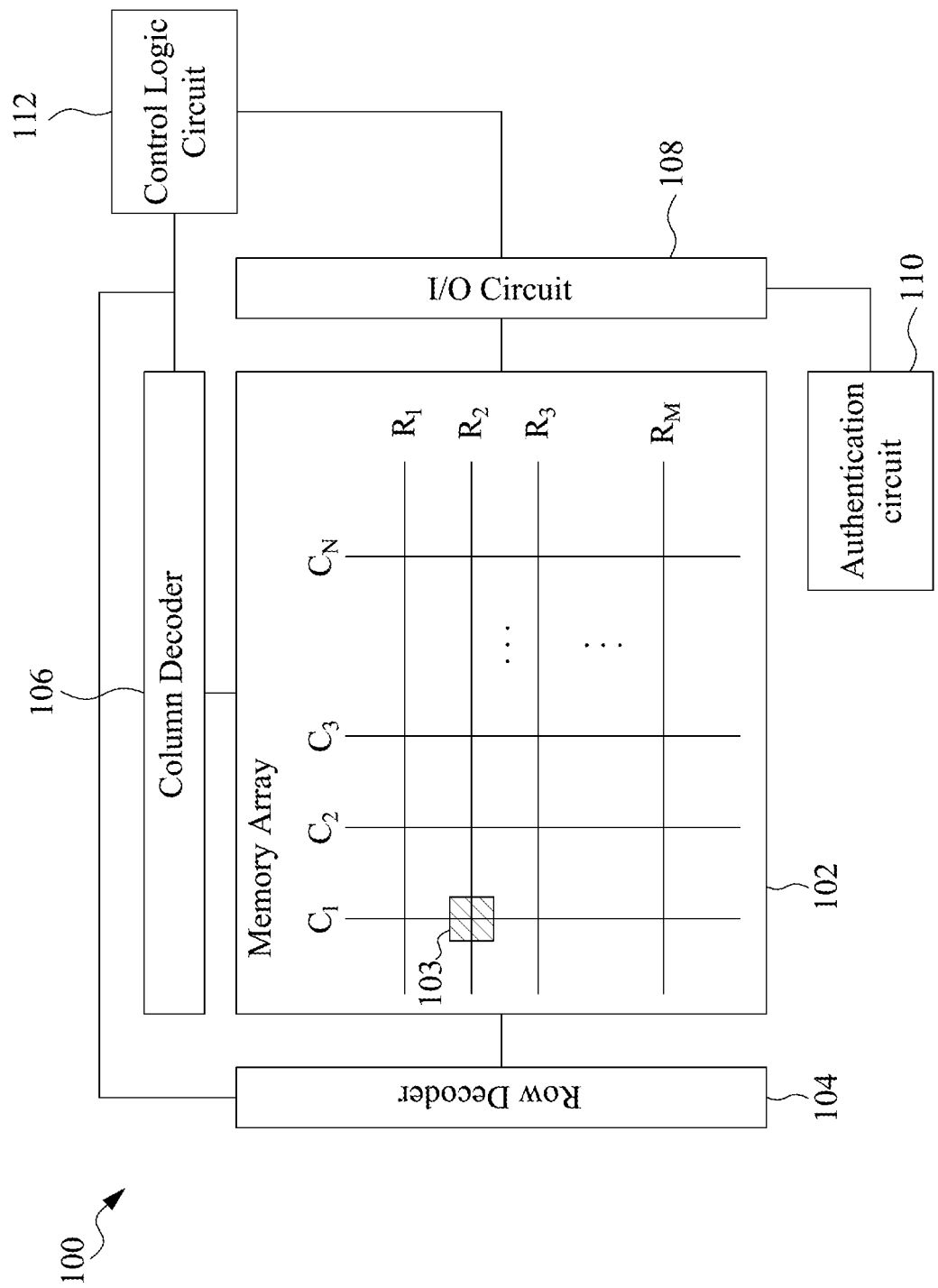
FIG. 1A illustrates a block diagram of an example memory system, in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over, or on a second feature in the description that follows may include embodiments in which the first and second features are formed in direct contact and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" "top," "bottom" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

A physically unclonable function (PUF) is generally used for authentication and secret key storage without requiring secure electrically erasable programmable read-only memory (EEPROMs) and/or other expensive hardware (e.g., battery-backed static random-access memory). Instead of storing secrets in a digital memory, the PUF derives a secret from physical characteristics of an integrated circuit (IC). The PUF is based on an idea that even though an identical manufacturing process is used to fabricate a number of ICs, each IC may be slightly different from one another due to manufacturing variability. PUFs leverage this variability to derive "secret" information that is unique to each of the ICs (e.g., a silicon biometric). Generally, such secret information is referred to as a "PUF signature" of the IC. In addition, due to the manufacturing variability that defines the PUF signature, one cannot manufacture two identical ICs even with full knowledge of the IC's design. Various types of variability of an IC can be used to define such a signature such as, for example, gate delay(s), power-on state(s) of a memory device, and/or any of a variety of physical characteristics of an IC.

Embodiments of the present disclosure provide various systems and methods to generate, at least, a bit of a PUF signature (sometimes referred to as a PUF bit) for/from a memory device that includes a number of memory cells. Each of the memory cells is implemented as an anti-fuse cell that includes a pair of programming transistors, a first pair of reading transistors, and a second pair of reading transistors. Even though the pair of programming transistors are formed in the same dimensions and the same material, while being concurrently with the same level of a programming voltage, one of the programming transistors can precede the other to be broken down by the programming voltage, according to various embodiments. Upon one of the programming transistors being broken down, the programming process may (e.g., spontaneously) stop. Alternatively stated, one of these two programming transistors can be randomly (and precedingly) programmed to equivalently form a resistor coupled to respective reading transistors (e.g., one from each of those pairs of reading transistors). According to which of the programming transistors is broken down first, the disclosed system (e.g., integrated with the memory device) can generate one PUF bit for/from the memory device. Applying the same principle over all of the memory cells, the disclosed system can generate a unique PUF signature from such a memory device.

By having multiple pairs of reading transistors, various advantages as for reading/programming performance of the disclosed memory cell can be offered. For example, one of the reading transistors in each pair is symmetrically disposed on both sides of a corresponding one of the programming transistors. As such, upon any of the programming transistors being precedingly programmed, the symmetrically coupled reading transistors can significantly decrease the resistance value of an equivalent resistor coupled to the programmed resistor (i.e., the broken-down programming transistor). This is because those symmetrically coupled reading transistors are shut to a same bit line (i.e., connected in parallel), and thus, the resistance value of the equivalent transistor (contributed by the reading transistors) can be significantly reduced, which can help increase a reading current of the memory cell. In turn, a read margin of each memory cell of the disclosed memory system can be improved.

With such a symmetrical configuration, the disclosed memory cell can be programmed at a relatively low level of programming voltage, which can expressively improve power consumption and lifetime of the memory system as a whole. Since the reading transistors are symmetrically disposed next to the programming transistor, the voltage level at a virtual node that connects both the reading transistors to one (virtual) end of the programming transistor can be pulled further close to ground. As such, the programming voltage applied on the other (virtual) end of the programming transistor is not required to be that high to effectively break down the programming transistor.

Further, the present disclosure provides various embodiments of methods to fabricate such a memory device in a high density for generating a sufficient number of PUF bits, which advantageously avoid the memory device from being tampered or otherwise unauthentically accessed. For example, the pair of programming transistors of each cell can be formed based on a gate-all-around (GAA) transistor configuration. Each of the programing transistors can have a channel constituted by a number of nanostructures (e.g., nanosheets, nanobridges, nanowires, etc.), and a gate structure at least partially wrapping around each of the nanostructures. The respective gate structures of the programming transistors may be (e.g., physically and electrically) isolated from each other with a dielectric fin structure, in accordance with various embodiments. By isolating the gate structures (and the channels) of the programming transistors from each other with the dielectric fin structure, such two programming transistors, configured to be randomly broken down, can be fabricated in a tighter pitch. Conventionally, the channels of transistors are typically formed in respective different active regions, which are required to be separated apart with a minimum spacing, given various design rule limitations. As such, the anti-fuse memory cell fabricated using the conventional techniques can occupy a significantly greater amount of real estate than the disclosed anti-fuse memory cell, which can make it challenging to integrate the existing anti-fuse memory cells into an integrated circuit that continues to evolve with advanced technologies.

FIG. 1A illustrates a memory system 100, in accordance with various embodiments. In the illustrated embodiment of FIG. 1A, the memory system 100 includes a memory array 102, a row decoder 104, a column decoder 106, an input/output (I/O) circuit 108, an authentication circuit 110, and a control logic circuit 112. Despite not being shown in FIG. 1A, all of the components of the memory system 100 may be coupled to each other and to the control logic circuit 112. Although, in the illustrated embodiment of FIG. 1A, each component is shown as a separate block for the purpose of clear illustration, in some other embodiments, some or all of the components shown in FIG. 1A may be integrated together. For example, the memory array 102 may include an embedded authentication circuit (e.g., 110).

The memory array 102 is a hardware component that stores data. In one aspect, the memory array 102 is embodied as a semiconductor memory device. The memory array 102 includes a plurality of memory cells (or otherwise storage units) 103. The memory array 102 includes a number of rows $R_1, R_2, R_3 \ldots R_M$, each extending in a first direction (e.g., X-direction) and a number of columns $C_1, C_2, C_3 \ldots C_N$, each extending in a second direction (e.g., Y-direction). Each of the rows/columns may include one or more conductive structures function as access lines. In some embodiments, each memory cell 103 is arranged in the intersection of a corresponding row and a corresponding column, and can be operated according to voltages or currents through the respective conductive structures of the column and row.

In some embodiments, each memory cell 103 is embodied as an anti-fuse memory cell that includes a first programming transistor, a second programming transistor, a first pair of reading transistors, and a second pair of reading transistors. The first programming and each of the first pair of reading transistors are coupled in series, and the second programming and each of the second pair of reading transistors are coupled in series. The first and second pairs of reading transistors can be concurrently or respectively turned on/off to enable/disable an access (e.g., program, read) to the respective first and second programming transistors. For example, upon being enabled, those two programming transistors can be programmed at the same time (e.g., by applying a same programming voltage). Randomly, one of the first and second programming transistors can be broken down faster than the other, and consequently, a logic state of the memory cell can be determined according to which of the two programming transistors has been broken down. Such randomly determined logic states of the memory cells can constitute the basis of a PUF signature. Detailed descriptions on configurations and operations of the memory cell 103 and its application to generate a PUF signature will be discussed below with respect to FIGS. 2A, 2B, and 3.

The row decoder 104 is a hardware component that can receive a row address of the memory array 102 and assert a conductive structure (e.g., a word line) at that row address. The column decoder 106 is a hardware component that can receive a column address of the memory array 102 and assert one or more conductive structures (e.g., a pair of source lines) at that column address. The I/O circuit 108 is a hardware component that can access (e.g., read, program) each of the memory cells 103 asserted through the row decoder 104 and column decoder 106. The authentication circuit 110 is a hardware component that can generate a PUF signature based on respective logic states of the memory cells read by the I/O circuit 108. The control logic circuit 112 is a hardware component that can control the coupled components (e.g., 102 through 110). Detailed descriptions on configurations and operations of memory system 100 are provided below with respect to FIGS. 2A, 2B, and 3.

Figure 1B:
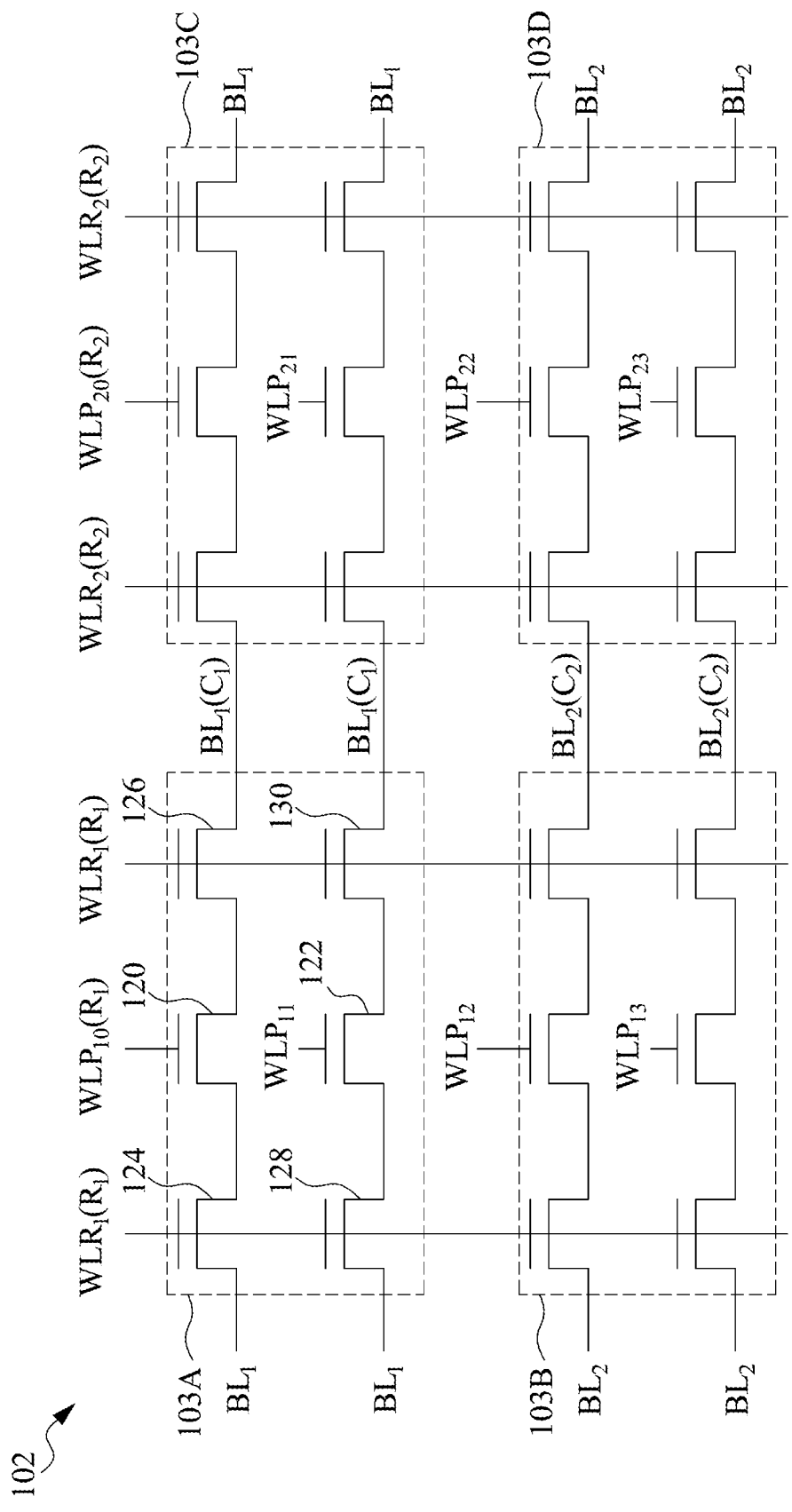
FIG. 1B illustrates an example circuit diagram of a portion of a memory array of the memory system of FIG. 1A, in accordance with some embodiments.

FIG. 1B illustrates an example circuit diagram of a portion of the memory device 100 (e.g., some of the memory cells 103), in accordance with some embodiments. In the illustrated example of FIG. 1B, anti-fuse memory cells 130A, 130B, 130C, and 130D of the memory array 102 are shown. Although four anti-fuse memory cells 103A-D are shown, it should be appreciated that the memory array 102 can have any number of anti-fuse memory cells, while remaining within the scope of present disclosure.

As mentioned above, the memory cells 103 can be arranged as an array. In FIG. 1B, the memory cells 103A and 103B may be disposed in a same row but in respectively different columns; and the memory cells 103C and 103D may be disposed in a same row but in respectively different columns. For example, the memory cells 103A and 103B are disposed in row $R_1$, but in columns $C_1$ and $C_2$, respectively; and the memory cells 103C and 103D are disposed in row $R_2$, but in columns $C_1$ and $C_2$, respectively. With such a configuration, each of the memory cells can be operatively coupled to the access lines in the corresponding row and column, respectively.

For example in FIG. 1B, the memory cell 103A is operatively coupled to a first programming word line, a second programming word line, and a reading word line in row $R_1$ (hereinafter $WLP_{10}$, $WLP_{11}$ and $WLR_1$, respectively) and to a bit line in column $C_1$ (hereinafter $BL_1$); the memory cell 103B is operatively coupled to a third programming word line (hereinafter $WLP_{12}$), a fourth programming word line (hereinafter $WLP_{13}$), and the reading word line $WLR_1$ in row $R_1$ and to a bit line in column $C_2$ (hereinafter $BL_2$); the memory cell 103C is operatively coupled to a first programming word line, a second programming word line, and a reading word line in row $R_2$ (hereinafter $WLP_{20}$, $WLP_{21}$ and $WLR_2$, respectively) and to the bit line $BL_1$ in column $C_1$; and the memory cell 103D is operatively coupled to a third programming word line (hereinafter $WLP_{22}$), a fourth programming word line (hereinafter $WLP_{23}$), and the reading word line $WLR_2$ in row $R_2$ and to the bit line $BL_2$ in column $C_2$.

In some embodiments, each of the memory cells 103A-D can be operatively coupled to the I/O circuit 108 through the respective WLR, WLP, and BL for being accessed (e.g., programmed, read). For example, the I/O circuit 108 can cause the row decoder 104 to assert the $WLP_{10}$, $WLP_{11}$, and $WLR_1$ and the column decoder 106 to assert the $BL_1$, so as to access the memory cell 103A. Accordingly, each of the memory cells 103A-D can be individually selected to be programmed or read. Details of programming and reading the memory cell will be discussed in further detail below.

Each of the memory cells 103A to 103D includes a number of programming transistors and a number of pairs of reading transistors, wherein each of the programming transistors is coupled to a corresponding pair of the reading transistors in series. Further, at least two of the programming transistors are separately gated, while the reading transistors may or may not be commonly gated, in accordance with various embodiments. In the illustrated example of FIG. 1B, the reading transistors disposed along the same row are commonly gated. The memory cell 103A is selected as a representative example in the following discussions.

As shown in FIG. 1B, the memory cell 103A includes programming transistors 120 and 122, a first pair of reading transistors 124 and 126, and a second pair of reading transistors 128 and 130. The programming transistor 120 is coupled to the reading transistors 124 and 126, respectively, in series; and the programming transistor 122 is coupled to the reading transistors 128 and 130, respectively, in series. One source/drain terminal of each of the programming transistors 120 and 122 is serially coupled to a source/drain terminal of one of the corresponding pair of reading transistors 124/128; and the other source/drain terminal of each of the programming transistors 120 and 122 is serially coupled to a source/drain terminal of the other of the corresponding pair of reading transistor 126/130. The other source/drain terminals of the reading transistors 124 to 130 are commonly coupled to the $BL_1$.

Specifically, the programming transistor 120 is gated by the $WLP_{10}$ (i.e., a gate terminal of the programming transistor 120 is coupled to the $WLP_{10}$), and the programming transistor 122 is gated by the $WLP_{11}$ (i.e., a gate terminal of the programming transistor 122 is coupled to the $WLP_{11}$). The reading transistors 124 to 130 are gated by the $WLR_1$ (i.e., respective gate terminals of the reading transistors 124 to 130 are coupled to the $WLR_1$). However, it should be understood that the gate terminals of the reading transistors 124 to 130 may be coupled to respective different WLRs.

According to various embodiment of present disclosure, the gate terminals (formed as gate structures as discussed below) of the programming transistors 120 and 122 may be isolated from each other by forming a dielectric fin structure interposed between the gate structures. Such a dielectric fin structure can also isolate channel structures of the programming transistors 120 and 122, thereby causing the perimeter of each channel structure to be wrapped by the corresponding gate structure except for one of the sidewalls in contact with (or otherwise disposed immediately next to) the dielectric fin structure. Details of the disclosed dielectric fin structure will be discussed below with respect to FIGS. 5A-C.

Each of other memory cells (e.g., 103B, 103C, 103D) is configured substantially similar as the memory cell 103A, and thus, the memory cells 103B through 103D are briefly described as follows. The memory cell 103B includes programming transistors gated by $WLP_{12}$ and $WLP_{13}$, respectively; the memory cell 103C includes programming transistors gated by $WLP_{20}$ and $WLP_{21}$, respectively; and the memory cell 103D includes programming transistors gated by $WLP_{22}$ and $WLP_{23}$, respectively.

Figure 2A:
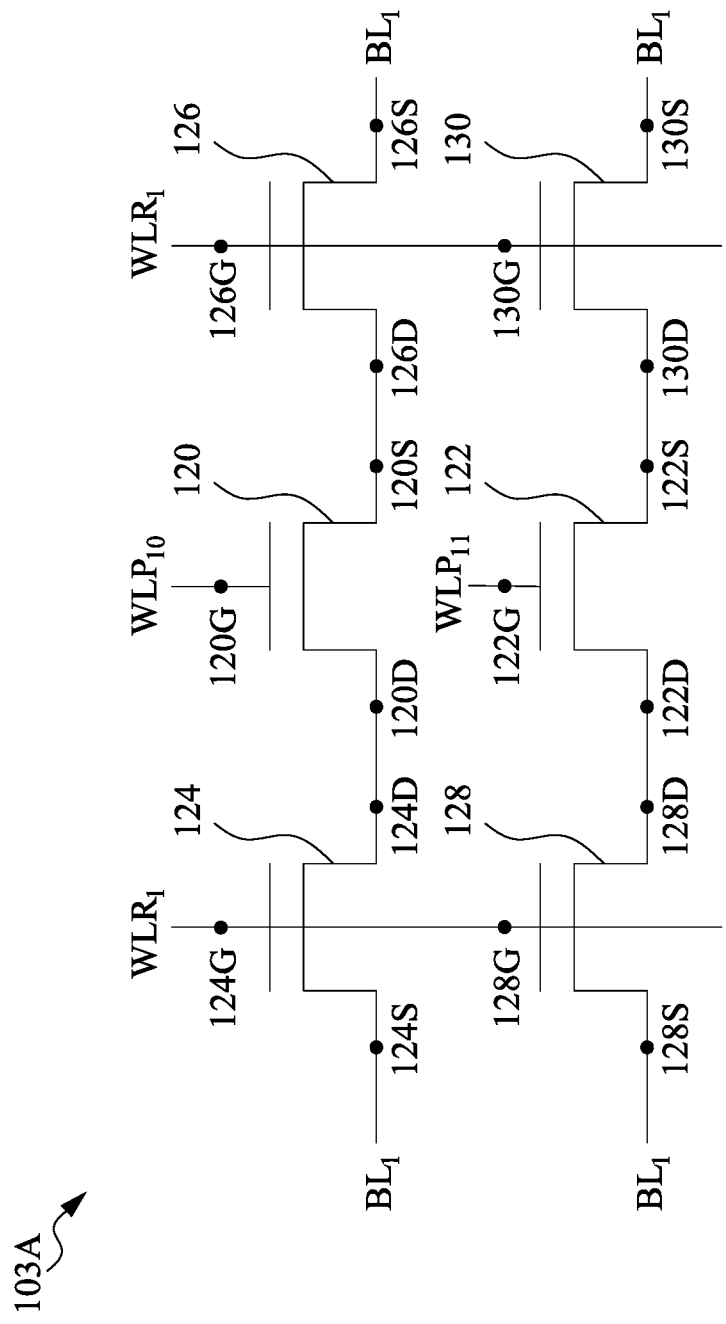
FIG. 2A illustrates an example circuit diagram of a memory cell of the memory array of FIGS. 1A-B, in accordance with some embodiments.

Referring first to FIG. 2A, provided is an example circuit diagram of the memory cell 103A to illustrate operations of each of the memory cells 103, in accordance with some embodiments. As shown, each of the programming/reading transistors, 120 to 130, may include an n-type metal-oxide-semiconductor field-effect-transistor (n-type MOSFET) or sometimes referred to as an NMOS transistor. However, it should be understood that each of the programming/reading transistors, 120 to 130, may include a p-type metal-oxide-semiconductor field-effect-transistor (p-type MOSFET), while remaining within the scope of present disclosure.

Specifically, the programming transistors 120 and 122 have their respective drain terminals 120D and 122D coupled to drain terminals of the reading transistors 124 and 128, 124D and 128D, respectively, and their respective source terminals 120S and 122S coupled to drain terminals of the reading transistors 126 and 130, 126D and 130D, respectively. Source terminals of the reading transistors 124 and 128, 124S and 128S, and source terminals of the reading transistors 126 and 130, 126S and 130S, are commonly coupled to the $BL_1$. The programming transistor 120 has a gate terminal 120G coupled to the $WLP_{10}$, and the programming transistor 122 has a gate terminal 122G coupled to the $WLP_{11}$. The reading transistors 124 to 130 have their respective gate terminals, 124G, 126G, 128G, and 130G, commonly coupled to the $WLR_1$.

To program the memory cell 103A, the reading transistors 124 to 130 are turned on by supplying a high enough voltage (e.g., a positive voltage corresponding to a logic high state) to their respective gate terminals via the $WLR_1$. Prior to, concurrently with or subsequently to the reading transistors 124 to 130 being turned on, a sufficiently high voltage (e.g., a breakdown voltage ($V_{BD}$) which is sometimes referred to as a programming voltage) is concurrently applied to the $WLP_{10}$ and $WLP_{11}$, and a low enough voltage (e.g., a positive voltage or ground voltage corresponding to a logic low state) is applied to the $BL_1$. The low voltage (applied on the $BL_1$) can be passed to the source/drain terminals 120S, 120D, 122S, and 122D. As such, that $V_{BD}$ can be concurrently present across the source terminal 120S and the gate terminal 120G of the programming transistor 120, across the drain terminal 120D and the gate terminal 120G of the programming transistor 120, across the source terminal 122S and the gate terminal 122G of the programming transistor 122, and across the drain terminal 122D and the gate terminal 122G of the programming transistor 122.

Due to processing variability, even though those two programming transistors (e.g., 120 and 122) are formed of the same materials (e.g., the same dielectric film) and made in identical dimensions, one of the two programming transistors should be broken down faster than the other programming transistors. For example, one or more portions of a gate dielectric layer of the programming transistor 120 or one or more portions of a gate dielectric layer of the programming transistor 122 can be precedingly broken down. Specifically, give that both source and drain terminals of each of the programming transistors 120 and 122 are symmetrically coupled to the $BL_1$ (e.g., ground) via the respective pair of reading transistors, electrical fields (induced by the programming voltage) can be symmetrically or otherwise uniformly distributed across the gate dielectric layers of the programming transistors 120 and 122, in various embodiments. As the gate terminal 120G of the programming transistor 120 and the gate terminal 122G of the programming transistor 122 are isolated from each other (with a dielectric fin structure), such a preceding breakdown can randomly and individually occur.

After the gate dielectric layer of the programming transistor 120 or 122 is broken down, a behavior of the portion of the gate dielectric layer interconnecting the gate terminal and its source/drain terminals is equivalently resistive. For example, such a portion of the gate dielectric layer of the programming transistor 120 (if broken down first) may function as a resistor 150, and such a portion of the gate dielectric layer of the programming transistor 122 (if broken down first) may function as a resistor 155, as shown in FIG. 2A. Before the programming (e.g., before the gate dielectric layer of either of the programming transistors 120 or 122 is broken down), no conduction path exists between the $BL_1$ and any of the $WLP_{10}$ and $WLP_{11}$, even if the reading transistors 124 to 130 are turned on. After the programming, a conduction path exists between the $BL_1$ and the $WLP_{10}$ (e.g., via the resistor 150) or between the $BL_1$ and the $WLP_{11}$ (e.g., via the resistor 155), when the reading transistors 124 to 130 are turned on.

Upon a breakdown occurs to one of the programming transistors 120 and 122, a conduction path is established. In an example where the programming transistor 120 is broken down first, a sudden increase of voltage can be present on the source terminal 120S and drain terminal 120D, which can induce a sudden increase of voltage on $BL_1$. Accordingly, a voltage level at the source terminal 122S and drain terminal 122D of the programming transistor 122 can be increased such that the programming process on the transistor 122 can be automatically stopped (as a voltage drop across its gate and source terminals is decreased). Consequently, the memory cell 103A can be "randomly" programmed to a first logic state or a second logic state. Whether the first or second logic state is programmed into the memory cell can correspond to which of the programming transistors is broken down (first), which may be determined based on a further reading process.

In some embodiments, the reading process can include concurrently applying a relatively low level of a voltage (sometimes referred to as a reading voltage) on the two programming transistors, an observable decrease of reading voltage may be present on the broken-down programming transistor, while the reading voltage applied on the non-broken-down programming transistor may remain substantially unchanged. In the above example where the programming transistor 120 is broken down (while the programming transistor 122 remains intact), the reading voltage applied on $WLP_{10}$ may be observed as lower than the reading voltage applied on $WLP_{11}$. As a result, a logic state of the cell 103A (i.e., a PUF bit) can be determined accordingly. Based on such a randomly programmed logic state on each of the memory cells, a PUF signature (formed of various PUF bits of the memory cells) can be generated.

Figure 2B:
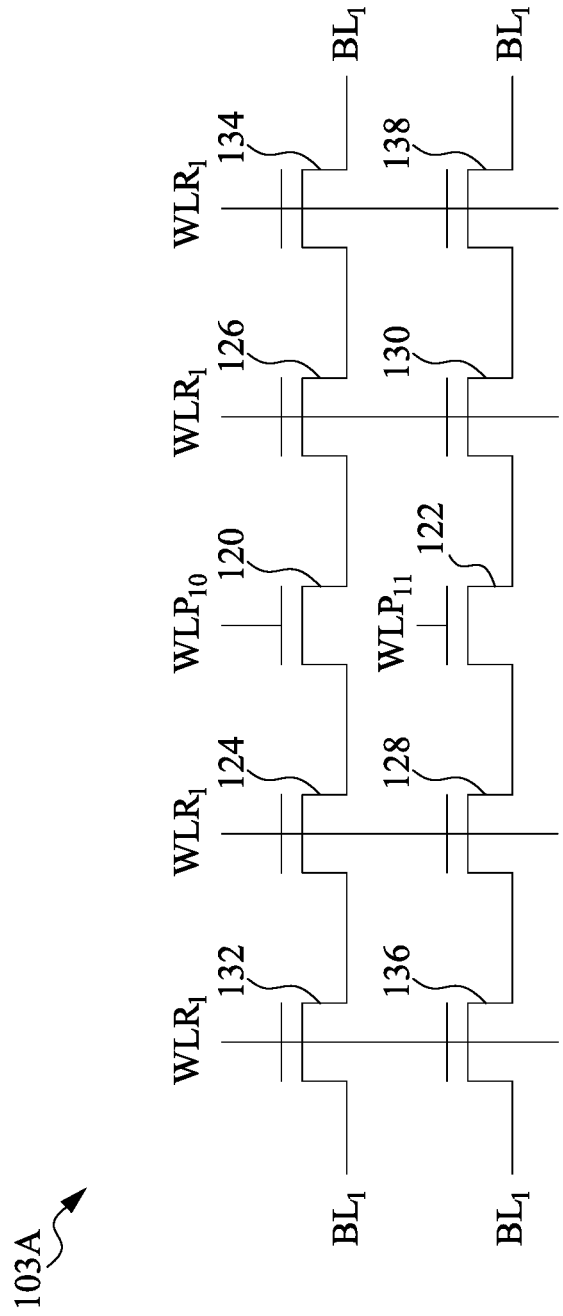
FIG. 2B illustrates another example circuit diagram of a memory cell of the memory array of FIGS. 1A-B, in accordance with some embodiments.

FIG. 2B illustrates another example circuit diagram of the memory cell 103A, in accordance with some embodiments. The circuit diagram of FIG. 2B is substantially similar as the circuit diagram of FIG. 2A except that the two additional pairs of reading transistors (132 and 136) and (134 and 138) are serially coupled to the second pair of reading transistors (124 and 128) and (126 and 130), respectively. As shown, a drain terminal of each of such additional reading transistors 132 to 138 is coupled to the source terminal of each of the corresponding (second pair of) reading transistors 124 to 130. Source terminals of the reading transistors 132 to 138 are commonly coupled to the $BL_1$. The reading transistors 132 to 138 have their respective gate terminals commonly coupled to the same reading word line, $WLR_1$. With such configuration (e.g., multiple reading transistors coupled to one of the source/drain terminals of each programming transistor), a read margin of the memory cell 103B may be enhanced.

Figure 3:
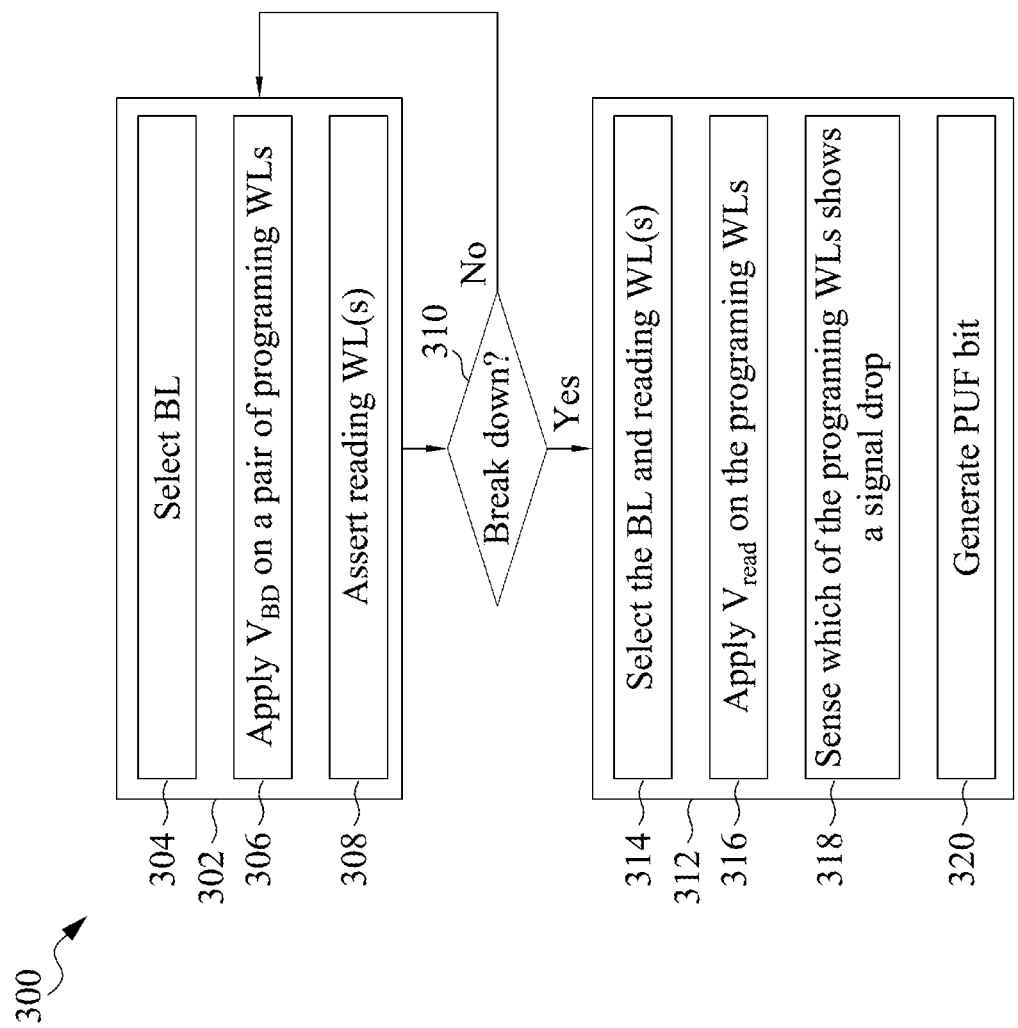
FIG. 3 illustrates a flow chart of an example method to operate the memory system of FIG. 1A, in accordance with some embodiments.

FIG. 3 illustrates an exemplary flow chart of a method 300 of generating a physically unclonable function (PUF) signature based on an anti-fuse memory cell including a pair of programming transistors and a pair of reading transistors, in accordance with various embodiments. Operations of method 300 are performed by one or more components illustrated in FIGS. 1A, 1B, 2A and 2B. For purposes of discussion, the following embodiment of the method 300 will be described in conjunction with FIGS. 1A, 1B, 2A and 2B (e.g., the memory cell 103A of FIG. 2A or 2B). The illustrated embodiment of the method 300 is merely an example so that any of a variety of operations may be omitted, re-sequenced, and/or added, while remaining within the scope of the present disclosure.

The method 300 starts at operation 302 of a programing process. Specifically, operation 302 includes operation 304 in which a bit line is selected, operation 306 in which a pair of programming word lines are concurrently applied with a high programming voltage (e.g., $V_{BD}$), and operation 408 in which one or more reading word lines are asserted. It should be noted the sequence of operations 304 to 308 can be changed, while remaining within the scope of present disclosure. For example, operation 308 may be performed prior to operations 304 and 306.

Referring first to operation 304, the control logic circuit 112 can provide a column address for the column decoder 106 to select one of the columns $C_1$ to $C_N$ of the memory array 102. Upon selecting a column, the I/O circuit 108 can provide a voltage (e.g., a logic low voltage) to a BL arranged in the selected column, e.g., $BL_1$ of FIG. 2A. In some embodiments, the selected $BL_1$ may be pulled to ground or a voltage corresponding to a logic low state. Next, the control logic circuit 112 can provide a row address for the row decoder 104 to select one of the rows $R_1$ to $R_M$ of the memory array 102. Upon selecting a row, the I/O circuit 108 can provide the programming voltage ($V_{BD}$) to a pair of programming word lines arranged in the selected row (operation 306), e.g., $WLP_{10}$ and $WLP_{11}$ of FIG. 2A, and the I/O circuit 108 can provide a voltage (e.g., corresponding to a logic high state) to a reading word line arranged in the selected row (operation 308), e.g., $WLR_1$ of FIG. 2A, thereby turning on the reading transistors 124 to 130. As such, the memory cell arranged in the intersection of the selected column and row (e.g., 103A) can be programmed.

Next, the method 300 proceeds to operation 310 to determine whether or not one of the programming transistors of the selected memory cell has been broken down (i.e., programmed). If so, the method 300 proceeds to operation 312 including one or more reading processes; and if not, the method 300 proceeds back to operation 302 to perform the programing process again. In various embodiments, the I/O circuit 108 can determine whether the breakdown occurs to one of the programming transistors based on detecting a voltage increase present on the selected BL (e.g., $BL_1$), as discussed above.

Operation 312 further includes operation 314 in which the bit line and the reading word line are selected or asserted, operation 316 in which the pair of programming word lines are concurrently applied with a relatively low reading voltage (Vread), operation 318 to sense which of the programming word lines shows a signal decrease, and operation 320 in which a PUF bit is generated.

Referring first to operation 314, the control logic circuit 112 can provide a column address for the column decoder 106 to select one of the columns $C_1$ to $C_N$ of the memory array 102 and provide a row address for the row decoder 104 to select one of the rows $R_1$ to $R_M$ of the memory array 102. In some embodiments, the column and row asserted in operation 314 is the same as the column asserted in operation 304 and the row asserted in operation 308, respectively. As a result, $BL_1$ is again pulled to ground, and the reading transistors 124 to 130 are again turned on. Referring next to operation 316, based on the selected row, the I/O circuit 108 can provide the Vread to the programming word lines arranged in the selected row, e.g., both of $WLP_{10}$ and $WLP_{11}$ of FIG. 2A. Thus, the memory cell 103A can be read. Next in operation 318, the I/O circuit 108 can sense which of the $WLP_{10}$ and $WLP_{11}$, connected to the memory cell 103A, shows a signal drop as discussed above.

Consequently, the control logic circuit 112 can determine the logic state programmed into the memory cell 103A based on whether it is $WLP_{10}$ and $WLP_{11}$ that has the signal drop and provide such a logic state to the authentication circuit 110 to generate a PUF bit (operation 320). If the signal drop is present on $WLP_{10}$ (i.e., the programming transistor 120 has been broken down), the control logic circuit 112 can determine that a first logic state has been programmed into the memory cell 103A. If the signal drop is present on $WLP_{11}$ (i.e., the programming transistor 122 has been broken down), the control logic circuit 112 can determine that a second logic state has been programmed into the memory cell 103A.

Figure 4A:
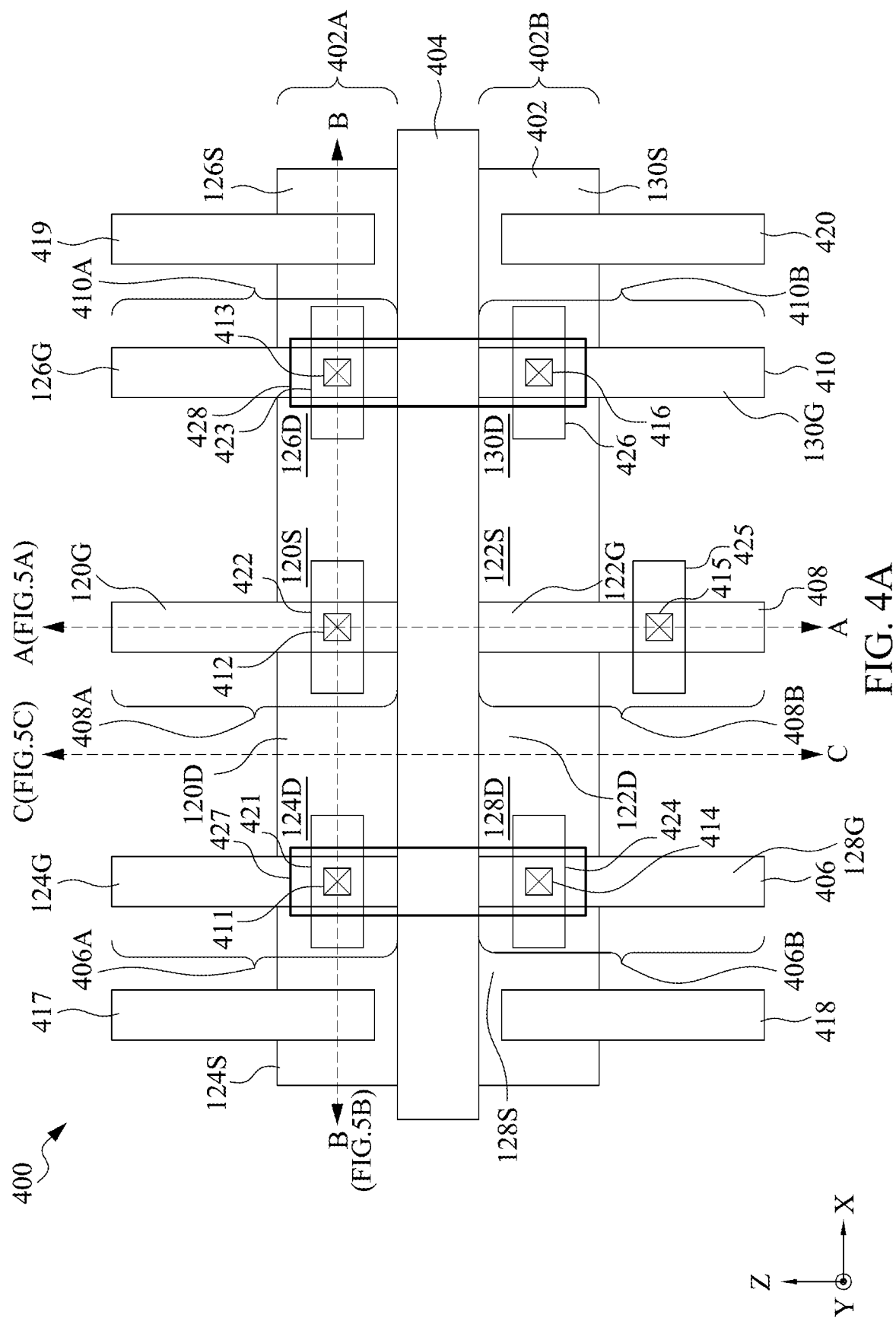
FIG. 4A illustrates an example layout to fabricate the memory cell of FIGS. 1A-B, in accordance with some embodiments.

FIG. 4A illustrates an example layout 400 to form one of the disclosed anti-fuse memory cells (e.g., 103A), in accordance with various embodiments. As shown, the layout 400 includes pattern 402 that is configured to form an active region (hereinafter "active region 402"); pattern 404 that is configured to form a dielectric fin structure (hereinafter "dielectric fin structure 404"); and patterns 406, 408, and 410 that are each configured to form a gate structure (hereinafter "gate structure 406," "gate structure 408," "gate structure 410," respectively). It should be understood that the layout 400 is simplified for purposes of illustration, and thus, the layout 400 can include various other patterns, while remaining within the scope of present disclosure.

The active region 402 may extend along a first lateral direction (e.g., X-direction) and the dielectric fin structure 404 may also extend along the same direction, while the gate structures 406 to 410 may extend along a second, different lateral direction (e.g., Y-direction). Further, the dielectric fin structure 404 extends across the active region 402, thereby separating the active region 420 into two portions along the Y-direction. Stated another way, the dielectric fin structure 404 may extend along the X-direction with a length that is longer than or about equal to a length with which the active region 402 extends along the same direction. For example in FIG. 4A, the dielectric fin structure 404 separates the active region 402 into two portions 402A and 402B. Still further, the dielectric fin structure 404 can separate the gate structure 406 into a number of portions, 406A and 406B, separate the gate structure 408 into a number of portions, 408A and 408B, and separate the gate structure 410 into a number of portions, 410A and 410B.

According to various embodiments, a layout used to fabricate an anti-fuse memory array may include a number of the layouts similar as 400 that are repeatedly arranged along the X-direction and Y-direction. However, it should be understood that such an array layout can include any number of each of the active regions, dielectric fin structures, and gate structures, while remaining within the scope of present disclosure. For example, the array layout does not necessarily have the same number of dielectric fin structures as the number of active regions, i.e., one or more of the active regions may not be separated by a dielectric fin structure.

According to embodiments, the active region 402 is formed of a stack structure protruding from a major surface of a substrate. The stack includes a number of semiconductor nanostructures (e.g., nanosheets) extending along the X-direction and vertically separated from each other. Portions of the semiconductor structures in the stack that are overlaid by the gate structures 406 and 408 remain, while other portions are replaced with a number of epitaxial structures.

The remaining portions of the semiconductor structures can be configured as the channel of a corresponding transistor, the epitaxial structures coupled to both sides (or ends) of the remaining portions of the semiconductor structures can be configured as source/drain structures (or terminals) of the transistor, and a portion of the gate structure that overlays (e.g., straddles) the remaining portions of the semiconductor structures can be configured as a gate structures (or terminal) of the transistor.

For example in FIG. 4A, a portion of the active region portion 402A that is overlaid by the gate structure portion 408A may include a number of nanostructures vertically separated from each other, which can function as a channel of the programming transistor 120 (FIG. 2A). Portions of the active region portion 402A that are disposed on opposite sides of the gate structure portion 408A are replaced with epitaxial structures. Such epitaxial structures can function as the source/drain terminals 120D and 120S of the programming transistor 120 (FIG. 2A), respectively. The gate structure portion 408A can function as the gate terminal 120G of the programming transistor 120 (FIG. 2A).

A portion of the active region portion 402B that is overlaid by the gate structure portion 408B may include a number of nanostructures vertically separated from each other, which can function as a channel of the programming transistor 122 (FIG. 2A). Portions of the active region portion 402B that are disposed on opposite sides of the gate structure portion 408B are replaced with epitaxial structures. Such epitaxial structures can function as the source/drain terminals 122D and 122S of the programming transistor 122 (FIG. 2A), respectively. The gate structure portion 408B can function as the gate terminal 122G of the programming transistor 122 (FIG. 2A).

A portion of the active region portion 402A that is overlaid by the gate structure portion 406A may include a number of nanostructures vertically separated from each other, which can function as a channel of the reading transistor 124 (FIG. 2A). Portions of the active region portion 402A that are disposed on opposite sides of the gate structure portion 406A are replaced with epitaxial structures. Such epitaxial structures can function as the source/drain terminals 124D and 124S of the reading transistor 124 (FIG. 2A), respectively. The gate structure portion 406A can function as the gate terminal 124G of the reading transistor 124 (FIG. 2A).

A portion of the active region portion 402A that is overlaid by the gate structure portion 406A may include a number of nanostructures vertically separated from each other, which can function as a channel of the reading transistor 124 (FIG. 2A). Portions of the active region portion 402A that are disposed on opposite sides of the gate structure portion 406A are replaced with epitaxial structures. Such epitaxial structures can function as the source/drain terminals 124D and 124S of the reading transistor 124 (FIG. 2A), respectively. The gate structure portion 406A can function as the gate terminal 124G of the reading transistor 124 (FIG. 2A).

A portion of the active region portion 402A that is overlaid by the gate structure portion 410A may include a number of nanostructures vertically separated from each other, which can function as a channel of the reading transistor 126 (FIG. 2A). Portions of the active region portion 402A that are disposed on opposite sides of the gate structure portion 410A are replaced with epitaxial structures. Such epitaxial structures can function as the source/drain terminals 126D and 126S of the reading transistor 126 (FIG. 2A), respectively. The gate structure portion 410A can function as the gate terminal 126G of the reading transistor 126 (FIG. 2A).

A portion of the active region portion 402B that is overlaid by the gate structure portion 406B may include a number of nanostructures vertically separated from each other, which can function as a channel of the reading transistor 128 (FIG. 2A). Portions of the active region portion 402B that are disposed on opposite sides of the gate structure portion 406B are replaced with epitaxial structures. Such epitaxial structures can function as the source/drain terminals 128D and 128S of the reading transistor 128 (FIG. 2A), respectively. The gate structure portion 406B can function as the gate terminal 128G of the reading transistor 128 (FIG. 2A).

A portion of the active region portion 402B that is overlaid by the gate structure portion 410B may include a number of nanostructures vertically separated from each other, which can function as a channel of the reading transistor 130 (FIG. 2A). Portions of the active region portion 402B that are disposed on opposite sides of the gate structure portion 410B are replaced with epitaxial structures. Such epitaxial structures can function as the source/drain terminals 130D and 130S of the reading transistor 130 (FIG. 2A), respectively. The gate structure portion 410B can function as the gate terminal 130G of the reading transistor 130 (FIG. 2A).

Further, the dielectric fin structure 404 is formed to also protrude from the major surface of the substrate. Such a dielectric fin structure extends along a sidewall of the stack structure (extending along the X-direction) formed based on the active region 402, and thus, one sidewall of each semiconductor nanostructure of the transistor channel (facing away or toward Y-direction) is in contact with the dielectric fin structure.

Using the programming transistor 120 as an example, while being overlaid by the gate terminal 120G, each of the nanostructures of the channel has a sidewall in contact with the dielectric fin structure 404. Specifically, each of the nanostructures has a top surface, a bottom surface, and four sidewalls. The top and bottom surfaces are wrapped by the gate terminal 120G. Two of the sidewalls facing the X-direction are coupled to the source/drain terminals 120D and 120S, respectively, one of the sidewalls facing away from the dielectric fin structure 404 is wrapped by the gate terminal 120G, and one of the sidewalls facing toward the dielectric fin structure 404 is in contact with the dielectric fin structure 404, which will be discussed in further detail with respect to FIGS. 5A-C.

Referring still to FIG. 4A, the layout 400 further includes a number of patterns to form via structures or interconnect structures. In particular, the layout 400 includes patterns 417, 418, 419, and 420, each of which is configured to form a middle-end interconnect structure, sometimes referred to as an MD (hereinafter "MD 417," "MD 418," "MD 419," and "MD 420," respectively), that connects a corresponding source/drain terminal to an upper interconnect structure.

The layout 400 also includes patterns 411, 412, 413, 414, 415, and 416, each of which is configured to form a via structure, sometimes referred to as a VG (hereinafter "VG 411," "VG 412," "VG 413," "VG 414," "VG 415," and "VG 416," respectively) that connects a corresponding gate terminal (or gate structure) to an upper interconnect structure (e.g., an M1 interconnect structure). For example, the VGs 411 through 416 connect the gate terminals 124G, 120G, 126G, 128G, 122G, and 130G to M1 interconnect structures 421, 422, 423, 424, 425, and 426, respectively. These M1 interconnect structures 421 to 426 may be formed by respective patterns of the layout 400, as shown. Further, the layout 400 includes patterns 427 and 428, each of which is configured to form a next upper interconnect structure (e.g., an M2 interconnect structure).

Corresponding to the circuit diagram shown in FIG. 2A, for example, the gate terminal 120G is coupled to a first programming word line (e.g., $WLP_{10}$), and the gate terminal 122G is coupled to a second programming word line (e.g., $WLP_{11}$), with the dielectric fin structure 404 interposed therebetween. The drain/source terminals 120D and 120S are connected to the drain terminals 124D and 126D, respectively. The drain/source terminals 122D and 122S are connected to the drain terminals 128D and 130D, respectively. The gate terminals 124G to 130G are all coupled to a same reading word line (e.g., $WLR_1$), for example, through at least the M1 interconnect structures 421-426 and M2 interconnect structures 427-428. The source terminals 124S to 130S are all coupled to a same bit line (e.g., $BL_1$). Although not shown, the layout 400 can include a number of other patterns to form respective interconnect structures to electrically couple the source terminals 124S-130S to the corresponding BL.

In some embodiments, one of the VGs 412 and 415 that are coupled to the gate terminals of the programming transistors may be offset from a (virtual) line formed by neighboring VGs 411-416 that are coupled to the gate terminals of the reading transistors. For example in FIG. 4A, the VG 412 is aligned with the VGs 411 and 413 along the X-direction, while the VG 415 is offset from a line formed by the VGs 414 and 416 along the X-direction. As such, the corresponding M1 interconnect structures may be offset from a (virtual) line formed by neighboring M1 interconnect structures. For example, the M1 interconnect structure 422 is aligned with the M1 interconnect structures 421 and 423 along the X-direction, while the M1 interconnect structure 425 is offset from a line formed by the M1 interconnect structures 424 and 426 along the X-direction.

Figure 4B:
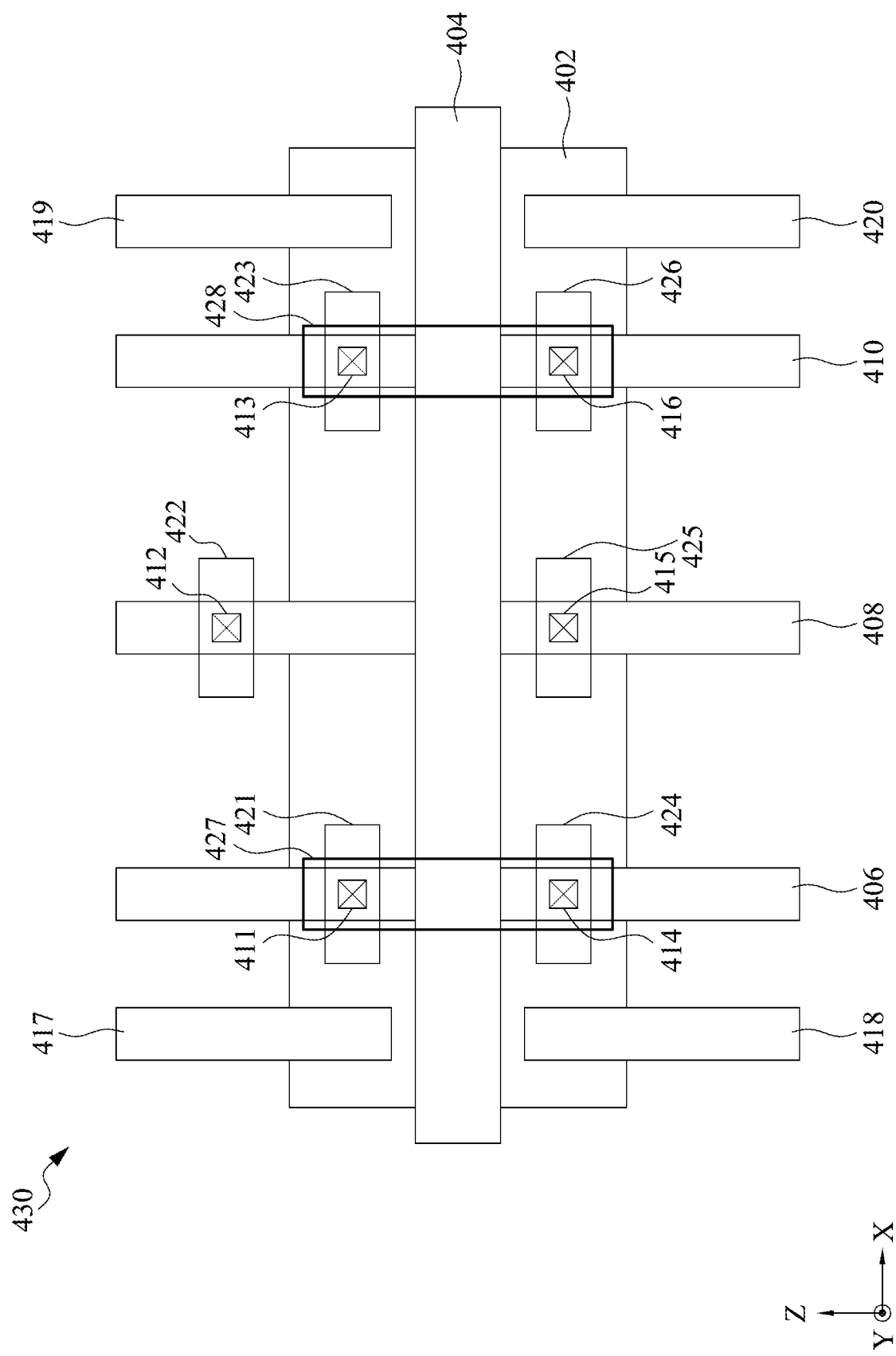
FIG. 4B illustrates another example layout to fabricate the memory cell of FIGS. 1A-B, in accordance with some embodiments.

FIG. 4B illustrates another example layout 430 to form one of the disclosed anti-fuse memory cells (e.g., 103A), in accordance with various embodiments. The layout 430 is substantially similar as the layout 400 except that the VG 412 is offset from the VGs 411 and 413 along the X-direction, while the VG 415 is aligned with a line formed by the VGs 414 and 416 along the X-direction. Accordingly, the M1 interconnect structure 422 is offset from the M1 interconnect structures 421 and 423 along the X-direction, while the M1 interconnect structure 425 is aligned with a line formed by the M1 interconnect structures 424 and 426 along the X-direction.

Figure 4C:
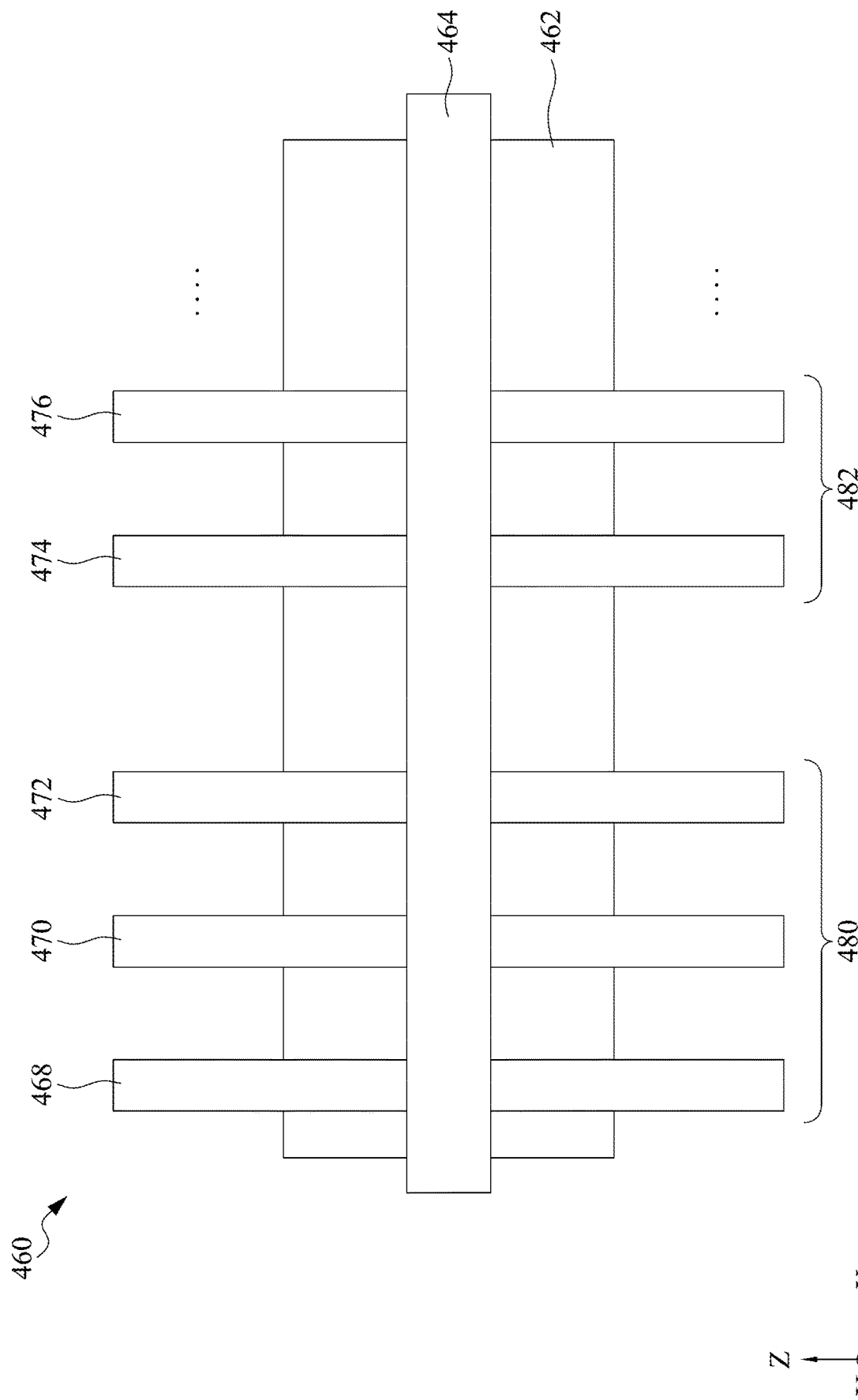
FIG. 4C illustrates yet another example layout to fabricate the memory cell of FIGS. 1A-B, in accordance with some embodiments.

FIG. 4C illustrates another example layout 460 to form a memory device that includes at least one of the disclosed anti-fuse memory cells (e.g., 103A) and at least one of another type of anti-fuse memory cells, in accordance with various embodiments. As shown, the layout 460 includes a pattern for forming an active region 462, a pattern for forming a dielectric fin structure 464, and a number of patterns for respectively forming gate structures 468, 470, 472, 474, and 476, which are similar as the layouts 400 and 430, and thus, the discussions are not repeated. Different from the layouts 400 and 430, the layout 460 incudes patterns a form a mix of a first type of anti-fuse memory cell (e.g., 480) and a second type of anti-fuse memory cell (e.g., 482). The first type may be embodied as the currently disclosed anti-fuse memory cell having two pairs of reading transistors coupled to a pair of programming transistors; and the second type may be embodied as an anti-fuse memory cell having a single pair of reading transistors coupled to a pair of programming transistors.

Figure 5A:
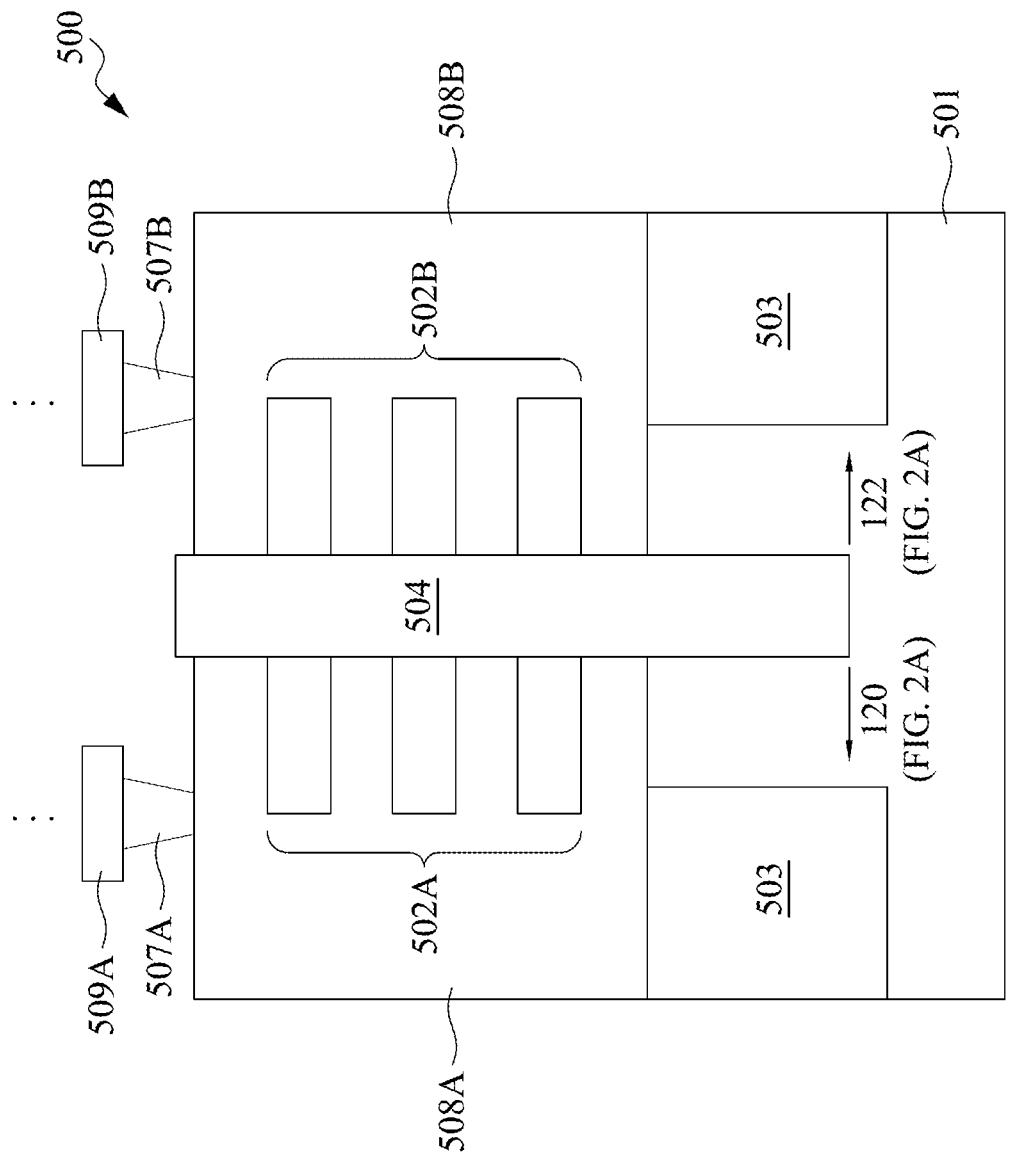
Figure 5A:
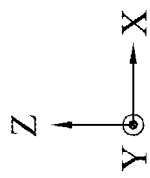
Figure 5B:
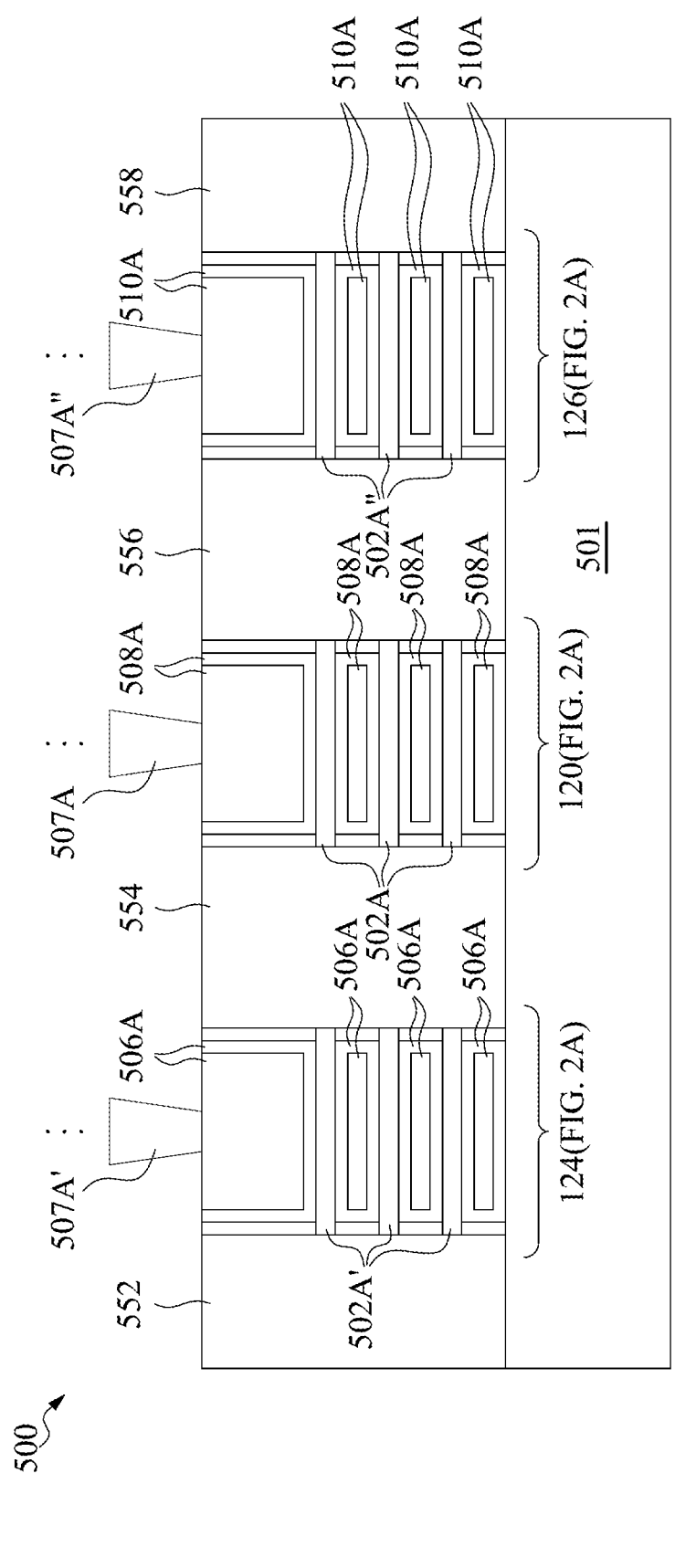

FIGS. 5A, 5B, and 5C illustrate various cross-sectional views of a memory device 500 fabricated based on the layout 400 of FIG. 4A, in accordance with various embodiments. For example, FIG. 5A illustrates the cross-sectional view of a portion of the memory device 500 that is cut along the gate structure portions 408A and 408B (e.g., the lengthwise direction of a gate structure); FIG. 5B illustrates the cross-sectional view of a portion of the memory device 500 that is cut along the active region portion 402A across the gate structure portions 406A, 408A, and 410A (e.g., the lengthwise direction of an active region); and FIG. 5C illustrates the cross-sectional view of a portion of the memory device 500 that is cut across the portions 402A-B and dielectric structure 404 between the gate structures 406 and 408 (e.g., in parallel with the lengthwise direction of a gate structure). It should be appreciated that a memory device fabricated based on the layout 430 (FIG. 4B) or 460 (FIG. 4C) should be substantially similar to the memory device 500. Thus, the following discussions will be focused on the memory device 500 formed based on the layout 400 of FIG. 4A.

Referring first to FIG. 5A, the memory device 500 includes a substrate 501 including a number of isolation regions (sometimes referred to as shallow trench isolation (STI) regions) 503 formed over a major surface of the substrate 501. Over the major surface, the memory device 500 includes plural sets of nanostructures, 502A and 502B. Each set includes a number of nanostructures vertically separated from one another, as shown. In some embodiments, such sets of nanostructures 502A to 502B can be fabricated based on the patterns 402A to 402B of the layout 400, respectively. The memory device 500 includes (e.g., metal) gate structures 508A and 508B, which can be fabricated based on the patterns 408A and 408B of the layout 400, respectively. The memory device 500 includes a dielectric fin structure 504, which can be fabricated based on the pattern 404 of the layout 400.

As shown in the cross-sectional view of FIG. 5A, each nanostructure of the sets 502A and 502B has a top surface, a bottom surface, and a first sidewall (facing away or toward the Y-direction) wrapped by a corresponding gate structure, with a second sidewall (facing away or toward the Y-direction) contacting a corresponding dielectric fin structure. As such, two sets of the nanostructures, together with a corresponding dielectric fin structure, may form a fork, according to various embodiments. For example, the sets of nanostructures 502A and 502B, together with the dielectric fin structure 504, may form a fork.

Referring still to FIG. 5A, the memory device 500 can further include a number of interconnect or via structures operatively (e.g., electrically) coupled to respective features. For example, the memory device 500 can include a first VG 507A configured to couple the gate structure 508A to a first programming word line (e.g., $WLP_{10}$ of FIG. 2A) through a first M1 interconnect structure 509A, and a second VG 507B configured to couple the gate structure 508B to a second programming word line (e.g., $WLP_{11}$ of FIG. 2A). The VGs 507A and 507B may be formed based on the patterns 412 and 415 of the layout 400, respectively; and the M1 interconnect structures 509A and 509B may be formed based on the patterns 422 and 425 of the layout 400, respectively.

Referring next to the cross-sectional view of FIG. 5B, the top surface and bottom surface of each nanostructure of set 502A are shown as being wrapped around by the gate structure 508A, which can include multiple layers, for example, a gate dielectric layer and a gate metal. Epitaxial structures 554 and 556, which respectively replace the portions of active region 402A on opposite sides of the gate structure portion 408A (FIG. 4A), are disposed on (or coupled to) the opposite sides of each nanostructure of set 502A (along the X-direction).

Such features/structures (e.g., the set of nanostructures 502A, gate structure 508A, and epitaxial structures 554 and 556) can operatively function as a first one of the programming transistors (e.g., 120 of FIG. 2A). As also shown in FIG. 5A, the gate structure 508A is coupled to the VG 507A.

Along the X-direction (e.g., the direction in which the active region 402 of FIG. 4A extends), the memory device 500 further includes a number of similar features/structures. For example, the memory device 500 includes another set of nanostructures 502A' (also formed based on the active region portion 402A of FIG. 4A), a gate structure 506A (formed based on the gate structure 406A of FIG. 4A), and another epitaxial structure 555. The set of nanostructures 502A', gate structure 506A, and epitaxial structures 552 and 554 can operatively function as one of the first pair of reading transistors (e.g., 124 of FIG. 2A). The gate structure 506A is coupled to VG 507A'. The memory device 500 includes yet another set of nanostructures 502A" (also formed based on the active region portion 402A of FIG. 4A), a gate structure 510A (formed based on the gate structure 410A of FIG. 4A), and yet another epitaxial structure 558. The set of nanostructures 502A", gate structure 510A, and epitaxial structures 556 and 558 can operatively function as one of the second pair of reading transistors (e.g., 126 of FIG. 2A). The gate structure 510A is coupled to VG 507A".

In some embodiments, the programming transistor and each of the reading transistors may share a same epitaxial structure (i.e., coupled in series), with the other epitaxial structure that functions as the source terminal of each of the reading transistors coupled to a bit line. For example, the programming transistor 120 and the reading transistor 124 share the epitaxial structure 554, and the programming transistor 120 and the reading transistor 126 share the epitaxial structure 556. Accordingly, it should be appreciated that the memory device 500 can include a number of interconnect structures operatively coupled to respective features. For example, the memory device 500 can include an interconnect structure (sometimes referred to as "MD") and a via structure (sometimes referred to as "VD") configured to couple the epitaxial structures 552 and 558 to a bit line (e.g., BL$_1$ of FIG. 2A).

Referring then to the cross-sectional view of FIG. 5C, the dielectric fin structure 504 can further separate respective epitaxial structures of the programming transistors (e.g., along the Y-direction). For example, the dielectric fin structure 504 separates the epitaxial structure 554 of a programming transistor (e.g., 120 formed based on the active region portion 402A of FIG. 4A) from the epitaxial structure 558 of the other programming transistor (e.g., 122 formed based on the active region 402B of FIG. 4A).

Figure 6:
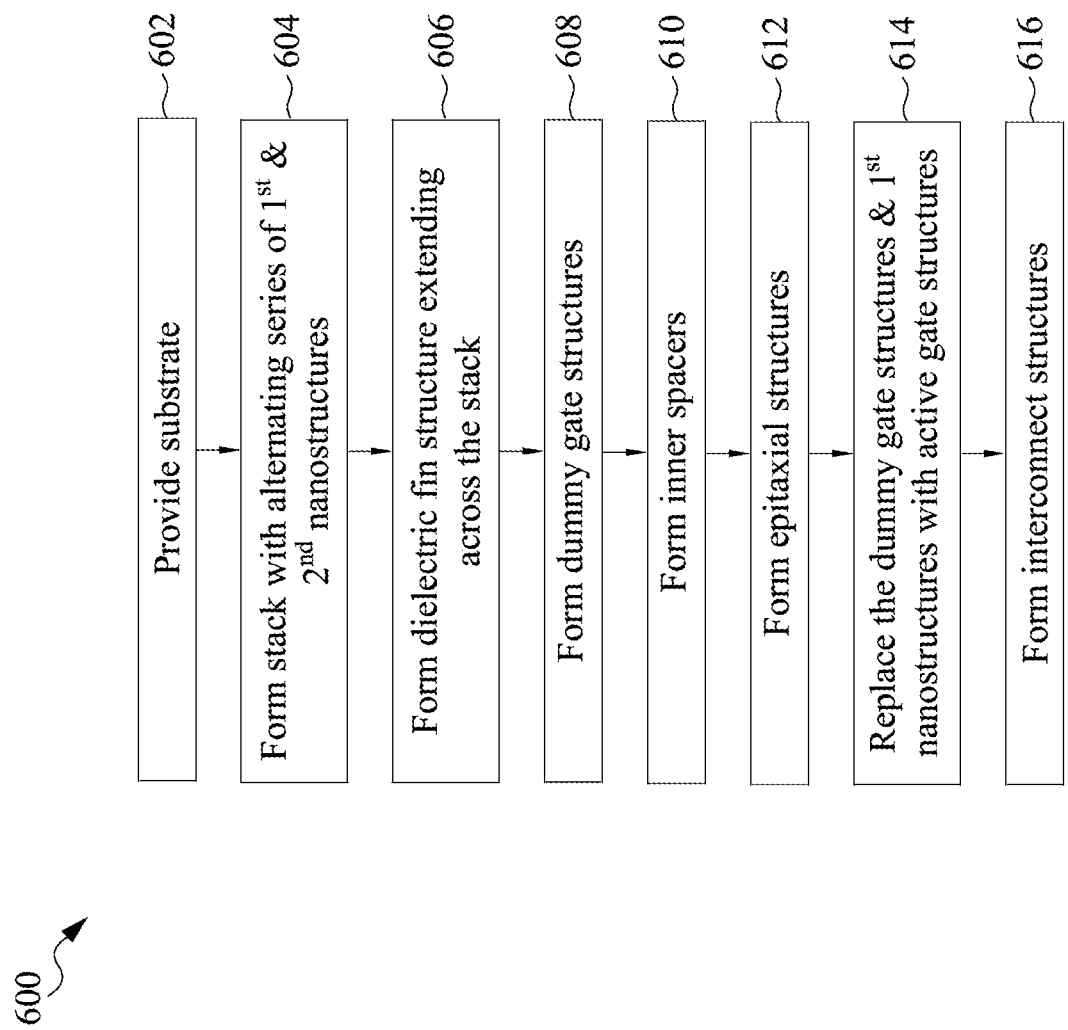
FIG. 6 illustrates a flow chart of a method to fabricate the memory device of FIGS. 5A-C, in accordance with some embodiments.

FIG. 6 illustrates a flowchart of a method 600 to form a portion of the above-described memory device 500, according to one or more embodiments of the present disclosure. For example, the method 600 includes operations to fabricate a number of programming transistors of an antifuse cell separated or otherwise isolated from each other with a dielectric fin structure. It is noted that the method 600 is merely an example and is not intended to limit the present disclosure. Accordingly, it is understood that additional operations may be provided before, during, and after the method 600 of FIG. 6, and that some other operations may only be briefly described herein.

The method 600 starts with operation 602 in which a substrate is provided, in accordance with various embodiments. The substrate includes a semiconductor material substrate, for example, silicon. Alternatively, the substrate may include other elementary semiconductor material such as, for example, germanium. The substrate may also include a compound semiconductor such as silicon carbide, gallium arsenic, indium arsenide, and indium phosphide. The substrate may include an alloy semiconductor such as silicon germanium, silicon germanium carbide, gallium arsenic phosphide, and gallium indium phosphide. In one embodiment, the substrate includes an epitaxial layer. For example, the substrate may have an epitaxial layer overlying a bulk semiconductor. Furthermore, the substrate may include a semiconductor-on-insulator (SOI) structure. For example, the substrate may include a buried oxide (BOX) layer formed by a process such as separation by implanted oxygen (SIMOX) or other suitable technique, such as wafer bonding and grinding.

The method 600 proceeds to operation 604 in which a stack, including an alternating series of first nanostructures and second nanostructures, is formed, in accordance with various embodiments. Such a stack can be formed based on one of the (active region) patterns discussed with respect to FIGS. 4A-C. In some embodiments, the first nanostructures may include SiGe sacrificial nanostructures, and the second nanostructures may include Si channel nanostructures. Such a stack may sometimes be referred to as a superlattice. In a non-limiting example, the SiGe sacrificial nanostructures can be SiGe 25%. The notation "SiGe 25%" is used to indicate that 25% of the SiGe material is Ge. It is understood the percentage of Ge in each of the SiGe sacrificial nanostructures can be any value between 0 and 100 (excluding 0 and 100), while remaining within the scope of present disclosure. In some other embodiments, the second nanostructures may include a first semiconductor material other than Si and the first nanostructures may include a second semiconductor material other than SiGe, as long as the first and second semiconductor materials are respectively characterized with different etching properties (e.g., etching rates).

The alternating series of nanostructures can be formed by epitaxially growing one layer and then the next until the desired number and desired thicknesses of the nanostructures are achieved. Epitaxial materials can be grown from gaseous or liquid precursors. Epitaxial materials can be grown using vapor-phase epitaxy (VPE), molecular-beam epitaxy (MBE), liquid-phase epitaxy (LPE), or other suitable process. Epitaxial silicon, silicon germanium, and/or carbon doped silicon (Si:C) silicon can be doped during deposition (in-situ doped) by adding dopants, n-type dopants (e.g., phosphorus or arsenic) or p-type dopants (e.g., boron or gallium), depending on the type of transistor.

The method 600 proceeds to operation 606 in which a dielectric fin structure is formed to extend across the stack, in accordance with various embodiments. By extending along the same lengthwise direction as the stack and being formed around a middle portion of the stack, the dielectric fin structure can separate at least a portion of the stack into two portions that are on opposite sides of the dielectric fin structure along a direction perpendicular to the lengthwise direction of the dielectric fin structure (and the stack).

The dielectric fin structure can be formed by performing at least some of the following operations: etching the stack to form a recess traversing across the stack until a major surface of the substrate is exposed or to a certain depth below the major surface; depositing a dielectric material to at least fill up the recess; and optionally polishing the workpiece to remove the excessive dielectric material. In some embodiments, the dielectric material is formed of an insulation material, such as an isolation dielectric. The insulation material may be an oxide, such as silicon oxide, a nitride, the like, or combinations thereof, and may be formed by a high-density plasma chemical vapor deposition (HDP-CVD), a flowable CVD (FCVD) (e.g., a CVD-based material deposition in a remote plasma system and post curing to make it convert to another material, such as an oxide), the like, or combinations thereof. Other insulation materials and/or other formation processes may be used.

The method 600 proceeds to operation 608 in which a number of dummy gate structures are formed, in accordance with various embodiments. Such a dummy gate structure can be formed based on one of the (gate structure) patterns discussed with respect to FIGS. 4A-C. The dummy gate structure can extend along a direction perpendicular to the lengthwise direction of the dielectric fin structure (and the stack). Further, the dummy gate structure may be formed shorter than the dielectric fin structure in one of various embodiments, and thus, the dummy gate structure, as formed, is cut (or otherwise separated) by the dielectric fin structure.

The dummy gate structure can be formed by depositing amorphous silicon (a-Si) over the stack. Other materials suitable for forming dummy gates (e.g., polysilicon) can be used while remaining within the scope of present disclosure. The a-Si is then planarized to a desired level. A hard mask is deposited over the planarized a-Si and patterned. The hard mask can be formed from a nitride or an oxide layer. An etching process (e.g., a reactive-ion etching (ME) process) is applied to the a-Si to form the dummy gate structure. After forming the dummy gate structure, gate spacers may be formed to extend along sidewalls of the dummy gate structure. The gate spacers can be formed by a conformal deposition of a dielectric material (e.g., silicon oxide, silicon nitride, silicon oxynitride, SiBCN, SiOCN, SiOC, or any suitable combination of those materials) followed by a directional etch (e.g., ME).

The method 600 proceeds to operation 610 in which inner spacers are formed by replacing end portions of each of the SiGe sacrificial nanostructures with a dielectric material, in accordance with various embodiments. Upon forming the dummy gate structure overlaying certain portions of the stack (e.g., the portions of the stack separated by the dielectric fin structure), the non-overlaid portions of the stack are removed. Next, respective end portions of each SiGe sacrificial nanostructure of the overlaid stack are removed. The inner spacers are formed by filling such recesses of each SiGe sacrificial nanostructure with a dielectric material by chemical vapor deposition (CVD), or by monolayer doping (MLD) of nitride followed by spacer ME. A material of the inner spacers can be formed from the same or different material as the gate spacers described above. For example, the inner spacers can be formed of silicon nitride, silicoboron carbonitride, silicon carbonitride, silicon carbon oxynitride, or any other type of dielectric material (e.g., a dielectric material having a dielectric constant k of less than about 5).

The method 600 proceeds to operation 612 in which a number of epitaxial structures are formed, in accordance with various embodiments. Upon forming the inner spacers, the epitaxial structures are formed using an epitaxial layer growth process on exposed ends of the Si nanostructures. In-situ doping (ISD) may be applied to form doped epitaxial structures, thereby creating the necessary junctions for a corresponding transistor (or sub-transistor). N-type and p-type FETs are formed by implanting different types of dopants to selected regions of the device to form the necessary junction(s). N-type devices can be formed by implanting arsenic (As) or phosphorous (P), and p-type devices can be formed by implanting boron (B). After forming the epitaxial structures, an inter-layer dielectric (e.g., silicon dioxide) is deposited to overlay the epitaxial structures.

The method 600 proceeds to operation 614 in which the dummy gate structures and the remaining SiGe sacrificial nanostructures are replaced with respective active gate structures, in accordance with various embodiments. Subsequently to forming the inter-layer dielectric, the dummy gate structures are removed by an etching process, e.g., RIE or chemical oxide removal (COR). Next, the remaining SiGe sacrificial nanostructures are removed while keeping the Si channel nanostructure substantially intact by applying a selective etch (e.g., a hydrochloric acid (HCl)). After the removal of the SiGe sacrificial nanostructures, top and bottom surfaces and sidewalls of each of the Si channel nanostructures can be exposed, except for the sidewall in contact with the dielectric fin structure. Next, a number of active gate structures can be formed to wrap around each of the Si channel nanostructures, except for the sidewall contacting the dielectric fin structure. Each of the active gate structures includes at least a gate dielectric layer (e.g., a high-k dielectric layer) and a gate metal layer (e.g., a work function metal layer). Upon the active gate structures are formed, at least a pair of programming transistors, a first pair of reading transistors, and a second pair of reading transistors of the disclosed anti-fuse cell can be formed.

The method 600 proceeds to operation 616 in which a number of interconnect structures are formed, in accordance with various embodiments. Upon forming the programming/reading transistors, a number of interconnect structures (e.g., VGs, VDs, MDs) are formed over the transistors. For example, a first VG is formed to connect a gate terminal of one of the programming transistors to a first programming word line, a second VG is formed to connect a gate terminal of the other of the programming transistors to a second programming word line, third, fourth, fifth, and sixth VGs are formed to respectively connect gate terminals of the reading transistors to a common reading word line, and an MD is formed to connect to source terminals of the second pair of reading transistors. The interconnect structure is formed of a metal material. The metal material can be selected from the group consisting of aluminum, tungsten, tungsten nitride, copper, cobalt, silver, gold, chrome, ruthenium, platinum, titanium, titanium nitride, tantalum, tantalum nitride, nickel, hafnium, and combinations thereof. Other metal materials are within the scope of the present disclosure. The interconnect structures can be formed by overlaying the workpiece with the above-listed metal material by, for example, chemical vapor deposition (CVD), physical vapor deposition (PVD), electroless plating, electroplating, or combinations thereof.

In one aspect of the present disclosure, a memory device is disclosed. The memory device includes a memory cell that randomly presents either a first logic state or a second logic state. The memory cell includes: a plurality of first nanostructures extending along a first lateral direction; a plurality of second nanostructures extending along the first lateral direction and disposed at a first side of the plurality of first nanostructures along the first lateral direction; a plurality of third nanostructures extending along the first lateral direction and disposed at a second side of the plurality of first nanostructures along the first lateral direction; a dielectric fin structure disposed immediately next to the plurality of first nanostructures along a second lateral direction, wherein a first sidewall of each of the plurality of first nanostructures facing toward or away from the second lateral direction is in contact with the dielectric fin structure, the second lateral direction being perpendicular to the first lateral direction; and a first gate structure wrapping around each of the plurality of first nanostructures except for the first sidewall.

In another aspect of the present disclosure, a memory system is disclosed. The memory system includes a memory array comprising a plurality of memory cells, each of the memory cells including a first programming transistor, a second programming transistor, a first reading transistor and a second reading transistor coupled to the first programming transistor in series, respectively, and a third reading transistor and fourth reading transistor coupled to the second programming transistor in series, respectively. The memory system includes an authentication circuit operatively coupled to the memory array. The authentication circuit generates a Physically Unclonable Function (PUF) signature based on respective logic states of the plurality of memory cells, and wherein the logic state of each of the plurality of memory cells is determined based on a preceding breakdown of either the corresponding first programming transistor or second programming transistor.

In yet another aspect of the present disclosure, a method for fabricating a memory device is disclosed. The method includes forming a plurality of first nanostructures, a plurality of second nanostructures, a plurality of third nanostructures, a plurality of fourth nanostructures, a plurality of fifth nanostructures, and a plurality of sixth nanostructures, wherein each of the plurality of first nanostructures, each of the plurality of second nanostructures, each of the plurality of third nanostructures, each of the plurality of fourth nanostructures, each of the plurality of fifth nanostructures, and each of the plurality of sixth nanostructures extend along a first lateral direction. The method includes separating the plurality of first nanostructures and the plurality of second nanostructures with a dielectric fin structure, wherein the dielectric structure also extends along the first lateral direction. The method includes forming a first gate structure wrapping around each of the first nanostructures except for a sidewall that is in contact with the dielectric fin structure. The method includes forming a second gate structure wrapping around each of the second nanostructures except for a sidewall that is in contact with the dielectric fin structure. The method includes forming at least a third gate structure straddling the plurality of second nanostructures and the plurality of fifth nanostructures. The method includes forming at least a fourth gate structure straddling the plurality of third nanostructures and the plurality of sixth nanostructures. The first through fourth gate structures each extend along a second lateral direction perpendicular to the first lateral direction. The method includes forming a first interconnect structure coupled to the first gate structure. The method includes forming a second interconnect structure coupled to the second gate structure. The method includes forming a third interconnect structure coupled to the third and fourth gate structures.

As used herein, the terms "about" and "approximately" generally mean plus or minus 10% of the stated value. For example, about 0.5 would include 0.45 and 0.55, about 10 would include 9 to 11, about 1000 would include 900 to 1100.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A memory device, comprising:
   a memory cell that randomly presents either a first logic state or a second logic state, the memory cell comprising:
      a plurality of first nanostructures extending along a first lateral direction;
      a plurality of second nanostructures extending along the first lateral direction and disposed at a first side of the plurality of first nanostructures along the first lateral direction;
      a plurality of third nanostructures extending along the first lateral direction and disposed at a second side of the plurality of first nanostructures along the first lateral direction;
      a dielectric fin structure disposed immediately next to the plurality of first nanostructures along a second lateral direction, wherein a first sidewall of each of the plurality of first nanostructures facing toward or away from the second lateral direction is in contact with the dielectric fin structure, the second lateral direction being perpendicular to the first lateral direction; and
      a first gate structure wrapping around each of the plurality of first nanostructures except for the first sidewall.

2. The memory device of claim 1, wherein the memory cell further comprises:
   a plurality of fourth nanostructures extending along the first lateral direction;
   a plurality of fifth nanostructures extending along the first lateral direction and disposed at a first side of the plurality of fourth nanostructures along the first lateral direction;
   a plurality of sixth nanostructures extending along the first lateral direction and disposed at a second side of the plurality of fourth nanostructures along the first lateral direction, wherein a second sidewall of each of the plurality of fourth nanostructures facing toward or away from the second lateral direction is in contact with the dielectric fin structure; and
   a second gate structure wrapping around each of the plurality of fourth nanostructures except for the second sidewall.

3. The memory device of claim 2, wherein the memory cell further comprises:
   at least one third gate structure straddling both of the plurality of second nanostructures and the plurality of third nanostructures; and
   at least one fourth gate structure straddling both of the plurality of fifth nanostructures and the plurality of sixth nanostructures.

4. The memory device of claim 3, wherein the first gate structure is coupled to a first programming word line, the second gate structures is coupled to a second programming word line, and the at least one third gate structure and fourth gate structure are coupled to a reading word line.

5. The memory device of claim 2, wherein the first gate structure includes a first gate dielectric layer configured to be broken down to present the first logic state for the memory cell, and the second gate structure includes a second gate dielectric layer configured to be broken down to present the second logic state for the memory cell.

6. The memory device of claim 5, wherein the first and second gate structures are concurrently applied with a programming voltage to randomly break down one of the first gate dielectric layer or the second gate dielectric layer.

7. The memory device of claim 2, wherein the plurality of first nanostructures form a channel of a first programming transistor of the memory cell, the plurality of second nanostructures form a channel of a second programming transistor of the memory cell, the plurality of third nanostructures form a channel of a first reading transistor of the memory cell, the plurality of fourth nanostructures form a channel of a second programming transistor of the memory cell, the plurality of fifth nanostructures form a channel of a third programming transistor of the memory cell, and the plurality of sixth nanostructures form a channel of a fourth reading transistor of the memory cell.

8. The memory device of claim 7, wherein the first programming transistor is coupled to the first reading transistor and the second reading transistor in series, respectively, and the second programming transistor is coupled to the third reading transistor and the fourth reading transistor in series, respectively.

9. The memory device of claim 1, wherein the dielectric fin structure also extends along the first lateral direction.

10. The memory device of claim 1, wherein either the first logic state or the second logic state functions as a bit of a Physically Unclonable Function (PUF) signature.

11. A memory system, comprising:
a memory array comprising a plurality of memory cells, each of the memory cells including a first programming transistor, a second programming transistor, a first reading transistor and a second reading transistor coupled to the first programming transistor in series, respectively, and a third reading transistor and a fourth reading transistor coupled to the second programming transistor in series, respectively; and
an authentication circuit operatively coupled to the memory array;
wherein the authentication circuit generates a Physically Unclonable Function (PUF) signature based on respective logic states of the plurality of memory cells, and wherein the logic state of each of the plurality of memory cells is determined based on a preceding breakdown of either the corresponding first programming transistor or second programming transistor.

12. The memory system of claim 11, wherein the first programming transistor has a channel constituted by a plurality of first nanostructures, and the second programming transistor has a channel constituted by a plurality of second nanostructures, and wherein the plurality of first nanostructures are isolated from the plurality of second nanostructures with a dielectric fin structure.

13. The memory system of claim 12, wherein the plurality of first nanostructures each have a first sidewall in direct contact with the dielectric fin structure, and the plurality of second nanostructures each have a second sidewall in direct contact with the dielectric fin structure.

14. The memory system of claim 13, wherein the first sidewall and second sidewall face each other.

15. The memory system of claim 11, further comprising:
an input/output (I/O) circuit operatively coupled to the memory array;
wherein the I/O circuit:
turns on the first through fourth reading transistors of one of the memory cells; and
simultaneously applies a programming voltage on respective gate terminals of the first and second programming transistors of the memory cell.

16. The memory system of claim 15, wherein in response to one of the first or second programming transistor being broken down, the I/O circuit further:
turns the first through fourth reading transistors;
simultaneously applies a reading voltage on the gate terminals of the first and second programming transistors; and
determines the logic state of the memory cell as a first state in response to identifying that the preceding breakdown is associated with the first programming transistor, and as a second state in response to identifying that the preceding breakdown is associated with the second programming transistor.

17. The memory system of claim 16, wherein the authentication circuit generates one bit of the PUF signature according to the logic state of the memory cell.

18. The memory system of claim 11, wherein each of the first programming transistor and second programming transistor includes a gate dielectric layer to be broken down, thereby forming a resistor.

19. A method for fabricating a memory device, comprising:
forming a plurality of first nanostructures, a plurality of second nanostructures, a plurality of third nanostructures, a plurality of fourth nanostructures, a plurality of fifth nanostructures, and a plurality of sixth nanostructures, wherein each of the plurality of first nanostructures, each of the plurality of second nanostructures, each of the plurality of third nanostructures, each of the plurality of fourth nanostructures, each of the plurality of fifth nanostructures, and each of the plurality of sixth nanostructures extend along a first lateral direction;
separating the plurality of first nanostructures and the plurality of second nanostructures with a dielectric fin structure, wherein the dielectric structure also extends along the first lateral direction;
forming a first gate structure wrapping around each of the first nanostructures except for a sidewall that is in contact with the dielectric fin structure;
forming a second gate structure wrapping around each of the second nanostructures except for a sidewall that is in contact with the dielectric fin structure;
forming at least a third gate structure straddling the plurality of second nanostructures and the plurality of fifth nanostructures;
forming at least a fourth gate structure straddling the plurality of third nanostructures and the plurality of sixth nanostructures, wherein the first through fourth gate structures each extend along a second lateral direction perpendicular to the first lateral direction;
forming a first interconnect structure coupled to the first gate structure;
forming a second interconnect structure coupled to the second gate structure; and
forming a third interconnect structure coupled to the third and fourth gate structures.

20. The method of claim 19, wherein, in response to the third interconnect structure being asserted, the first and second interconnect structures are concurrently applied with a programming voltage to randomly break down a gate dielectric layer of one of the first gate structure or the second gate structure.

* * * * *